(12) United States Patent
Fischer et al.

(10) Patent No.: US 10,176,725 B2
(45) Date of Patent: Jan. 8, 2019

(54) SYSTEM AND METHOD OF PERVASIVE DEVELOPMENTAL DISORDER INTERVENTIONS

(75) Inventors: Gregory S. Fischer, Boston, MA (US); Hao Su, Worcester, MA (US); Laurie Dickstein-Fischer, Boston, MA (US); Kevin Harrington, Suffield, CT (US); Elizabeth V. Alexander, Shrewsbury, MA (US)

(73) Assignee: WORCESTER POLYTECHNIC INSTITUTE, Worcester, MA (US)

( * ) Notice: Subject to any disclaimer, the term of this patent is extended or adjusted under 35 U.S.C. 154(b) by 0 days.

(21) Appl. No.: 13/598,066

(22) Filed: Aug. 29, 2012

(65) Prior Publication Data

US 2013/0078600 A1 Mar. 28, 2013

Related U.S. Application Data

(60) Provisional application No. 61/528,531, filed on Aug. 29, 2011.

(51) Int. Cl.
G09B 19/00 (2006.01)
(52) U.S. Cl.
CPC .................... *G09B 19/00* (2013.01)
(58) Field of Classification Search
CPC ............ A63H 2200/00; A63H 2011/00; A63H 2011/16; A63H 29/00; A63H 29/22
USPC .................................. 434/236, 238
See application file for complete search history.

(56) References Cited

U.S. PATENT DOCUMENTS

| | | | |
|---|---|---|---|
| 2003/0059750 A1* | 3/2003 | Bindler et al. | 434/236 |
| 2007/0117073 A1* | 5/2007 | Walker et al. | 434/236 |
| 2007/0154870 A1* | 7/2007 | Ongkojoyo | 434/236 |
| 2009/0055019 A1 | 2/2009 | Stiehl et al. | |
| 2010/0023163 A1* | 1/2010 | Kidd | G06N 3/008 700/245 |
| 2010/0145729 A1* | 6/2010 | Katz | 705/3 |

(Continued)

OTHER PUBLICATIONS

Dautenhahn, K. et al., "Towards interactive robots in autism therapy," Pragmatics & Cognition 12:1 (2004), 1-35.

*Primary Examiner* — Bruk Gebremichael
(74) *Attorney, Agent, or Firm* — Venable LLP; Michele V. Frank, Esq.

(57) ABSTRACT

Methods and systems for observing/analyzing interactive behavior are presented. In one instance, the method for observing/analyzing interactive behavior includes interacting, using a robot, with a subject and obtaining data from interaction between the subject and the robot, the data from the data acquisition components, the data being used for diagnosis and/or charting progress. In one instance, the robot includes data acquisition components, interaction inducing components (such as, but not limited to, movable eyelids, movable appendages, sound generating components), a control component operatively connected to the interaction inducing components and a processing component operatively connected to the control component and the data acquisition components, the processing component being configured to obtain data from the data acquisition components, the data being used for diagnosis and/or charting progress. In one instance, the robot is integrated with a computer-aided system for diagnosis, monitoring, and therapy.

60 Claims, 22 Drawing Sheets

(56) References Cited

U.S. PATENT DOCUMENTS

2011/0014847 A1\* 1/2011 Fingerer et al. .............. 446/227
2011/0067521 A1 3/2011 Linn et al.

\* cited by examiner

SYSTEM AND METHOD OF PERVASIVE DEVELOPMENTAL DISORDER INTERVENTIONS

CROSS REFERENCE TO RELATED APPLICATIONS

This application claims priority to U.S. Provisional Application Ser. No. 61/528,531, filed Aug. 29, 2011, entitled, SYSTEM AND METHOD OF AUTISM SPECTRUM DISORDER INTERVENTIONS, which is incorporated by reference herein in its entirety and for all purposes.

FIELD OF INVENTION

The present invention relates to a system and approach for interventions including computer-aided diagnosis, assessment, and therapy for pervasive developmental disorders, more specifically incorporating a robotic system for interacting with subjects affected by pervasive developmental disorders including all forms of autism spectrum disorder or other afflictions.

BACKGROUND

Pervasive Developmental Disorders (PDDs) are characterized by severe and pervasive impairment in several areas of development: reciprocal social interaction skills, communication or the presence of stereotyped behavior, interests, and activities. The qualitative impairments that define these conditions are distinctly deviant relative to the individual's developmental level or mental age. PDDs include Autistic Disorder, Rett's Disorder, Childhood Disintegrative Disorder, Asperger's Disorder, and Pervasive Development Disorder Not Otherwise Specified (PDD-NOS), Autism Spectrum Disorders (ASDs) are a group of developmental disabilities characterized by atypical development in socialization, communication and behavior. The Center for Disease Control and Prevention estimates that an average of 1 in 110 children in the U.S. has ASD (www.cdc.gov). A child classified as autistic must show delays in the development of: social interaction, communication and behaviors. Social interaction includes non-verbal behaviors such as eye contact or gaze, facial expression, body posturing and gestures that regulate social interaction. Children with ASD usually exhibit difficulty in responding appropriately to sensory messages.

Asperger's Syndrome differs from other autism spectrum disorders by its relative preservation of linguistic and cognitive development. It is much like autism in that those affected may have difficulty picking up on social cues, body language, and speech pitch and tone, and they may have difficulty overall with social situations. Other similarities include dislike of routine changes, fixation or hyper focus on specific interests, talking a lot and about only their own interests, and increased sensitivity of one or more of the five senses.

While there is currently no specific cure for Autism, there are biomedical, therapeutic and educational treatment plans to remediate the delayed development and ameliorate behaviors, Social interventions use structured and planned curricula to teach social behaviors to children with ASD. However, social interventions to date are limited in the extent to which they address socially coordinated interaction.

Applied behavior analysis (ABA) relies on one-on-one teaching that aims to modify the child's behavior by reinforcing the child to practice various skills. This type of program usually is done at the home of the child with an ABA therapist supervising. Because of these characteristics of the treatment, it can be exceptionally expensive, unaffordable by many families, and outside funding for such treatment can be very difficult to gain. Further, there are various levels of training and expertise in providing therapy. There is therefore a need to standardize level of care.

Treatments for ASD fall into two categories, cognitive and behavioral. The present embodiment of the invention is primarily for behavioral diagnosis and treatment therapy. Alternate embodiments or configurations of the invention may be utilized for cognitive therapy including academic exercises in addition to, or instead of, behavioral therapy.

Research has shown that early interventions can improve outcomes. Traditionally, autism is diagnosed by a clinician who directly interacts with the child. Due to the fact that the clinician cannot repeat the exact same actions each visit with the child and it takes several periods of interacting with the child to gain a diagnosis, the clinician could diagnose children differently each time. This present intention for diagnosis makes the tests more repeatable and accessible thus making the diagnosis more reliable. In an embodiment of the present invention, a low-cost portable robotic device may provide the ability expedite diagnosis in rural areas or other locations where direct access to clinicians is limited. A webcam may be used to telecommunicate between a doctor and children to improve the number of patients that can be assessed to speed diagnosis, this further enabling early intervention. The present invention may be used either for remote controlled interactions with manual assessment, or may be used to assist in automated or semi-automated diagnosis and therapy.

Technology is being used increasingly to help diagnose autism at earlier ages. Kozima et al. designed a 4 degree of freedom (DOT) interactive robot Keepon to interact with children with autism. This simple and adorable robot gave the children a playful and joyful mood and helped them to transfer the interpersonal communication learnt with Keepon to triadic play with adults or other children, Campolo et al. utilized sensors to detect abnormalities in infants targeting abnormalities that would point to autism. These sensors test the children's responsiveness to visual and audio cues, how they move their arms and legs, and how they handle and play with a ball.

Other authors investigated how a small minimally expressive humanoid robot can assume the role of a social mediator—encouraging children with autism to interact with the robot, to break their isolation and importantly, to facilitate interaction with other people. They demonstrate that the robot effectively helped to mediate and encourage interaction between the children and co-present adults.

The manifestation of PDDs such as autism spectrum disorder, the scarcity of evaluation of syndrome status, and the formidable high cost of clinical diagnosis necessitates the development of a low cost tool to aid the diagnosis and therapy of ASD for healthcare center, special education school and even home application.

SUMMARY

The needs set forth herein as well as further and other needs and advantages are addressed by the present embodiments, which illustrate solutions and advantages described below.

In one or more embodiments, the method of these teachings for observing/analyzing interactive behavior includes interacting, using a robot, with a subject and obtaining data from interaction between the subject and the robot, the data from the data acquisition components; wherein the data is used for diagnosis and/or charting progress. In one instance, the robot includes data acquisition components, interaction inducing components (such as, but not limited to, movable eyelids, movable appendages, sound generating components), a control component operatively connected to the interaction inducing components and a processing component operatively connected to the control component, the data acquisition components; the processing component configured to obtain data from the data acquisition components; wherein the data is used for diagnosis and/or charting progress. In one instance, the processing component in the robot is configured by including computer usable media having computer readable code embodied therein that instructs a processor in the processing component) to communicate with a process in at least one external system. In that instance, in some embodiments, the method of these teachings can be expressed in terms of the action being performed at the external system. In one embodiment, the method of these teachings includes diagnosing a subject, typically a child, suspected of being affected by pervasive developmental disorders. In some embodiments, the robot is compact and portable, in other embodiments, the robot is operated remotely. In some instances, the system including the robot and external system incorporates automation of at least one aspect of the diagnosis. In those instances, measures are used for charting progress of treatment. In other instances, the system provides quantitative measures related to the diagnosis. In other instances, a supervisor, such as a clinician, operates the external system in order to perform a diagnosis. In such instances, a preliminary diagnosis may be made rapidly when in person diagnosis is not available, leading to early intervention.

In one or more embodiments, the robot of these teachings includes a number of actuators, a number of sensors, interaction inducing components operatively connected to at least some of the actuators, a control component operatively connected to the actuators and a processing component operatively connected to the control component and to the sensors; the processing component comprising computer usable media having computer readable code embodied therein that instructs a processor in the processing component operate the interaction inducing components according to predetermined instructions and obtain data from interaction between a subject and the robot, wherein the data is used for diagnosis and/or charting progress.

In one instance, the computer readable code also instructs the processor in the processing component of the problem of these teachings to communicate with a process in at least one external system, in another instance, the robot is a humanoid robot. In seine embodiments, the robot is compact and portable. In other embodiments, the robot is operated remotely. In some instances, the system including the robot and external system incorporates automation of at least one aspect of the diagnosis. In those instances, measures are used for charting progress of treatment. In one instance, the processing component in the robot is configured to assist in performing behavioral analysis therapy.

In one or more embodiments, the robot is configured to have compliance in the joints or actuation system. In one instance, the compliance increases the safety of the robotic device when interacting with a human. In one or more embodiments, the one or more actuators (actuation systems) incorporate a cable and an elastic element in series. In one instance, the one or more actuation systems or joints are readily detached and attached.

In one or more embodiments, the system of these teachings for observing/analyzing interactive behavior includes a robot having a number of actuators, a number of sensors, interaction inducing components operatively connected to at least some of the actuators, a control component operatively connected to the actuators and a processing component operatively connected to the control component and to the sensors; the processing component comprising computer usable media having computer readable code embodied therein that instructs a processor in the processing component to communicate with a process in at least one external system, operate the interaction inducing components according to predetermined instructions and obtain data from interaction between a subject and the robot, wherein the data is used for diagnosis and/or charting progress, and an external system configured to communicate with the robot, the external system having a supervisory processing component configured to communicate with the robot, the supervisory processing component also configured to obtain data from interaction between a subject and the robot; die supervisory processing component also configured to use the data for diagnosis and/or charting progress, and a display operatively connected to the supervisory processing component.

Additional advantages of the present invention will become readily apparent to those skilled in this art from the following detailed description, wherein only selected embodiments of the present invention are shown and described. As will be realized, the present invention is capable of other and different embodiments, and its several details are capable of modifications in various obvious respects, all without departing from the invention. Accordingly, the drawings and description are to be regarded as illustrative in nature, and not as restrictive.

For a better understanding of the present teachings, together with other and further objects thereof, reference is made to the accompanying drawings and detailed description and its scope will be pointed out in the appended claims.

DETAILED DESCRIPTION

Figure 1:
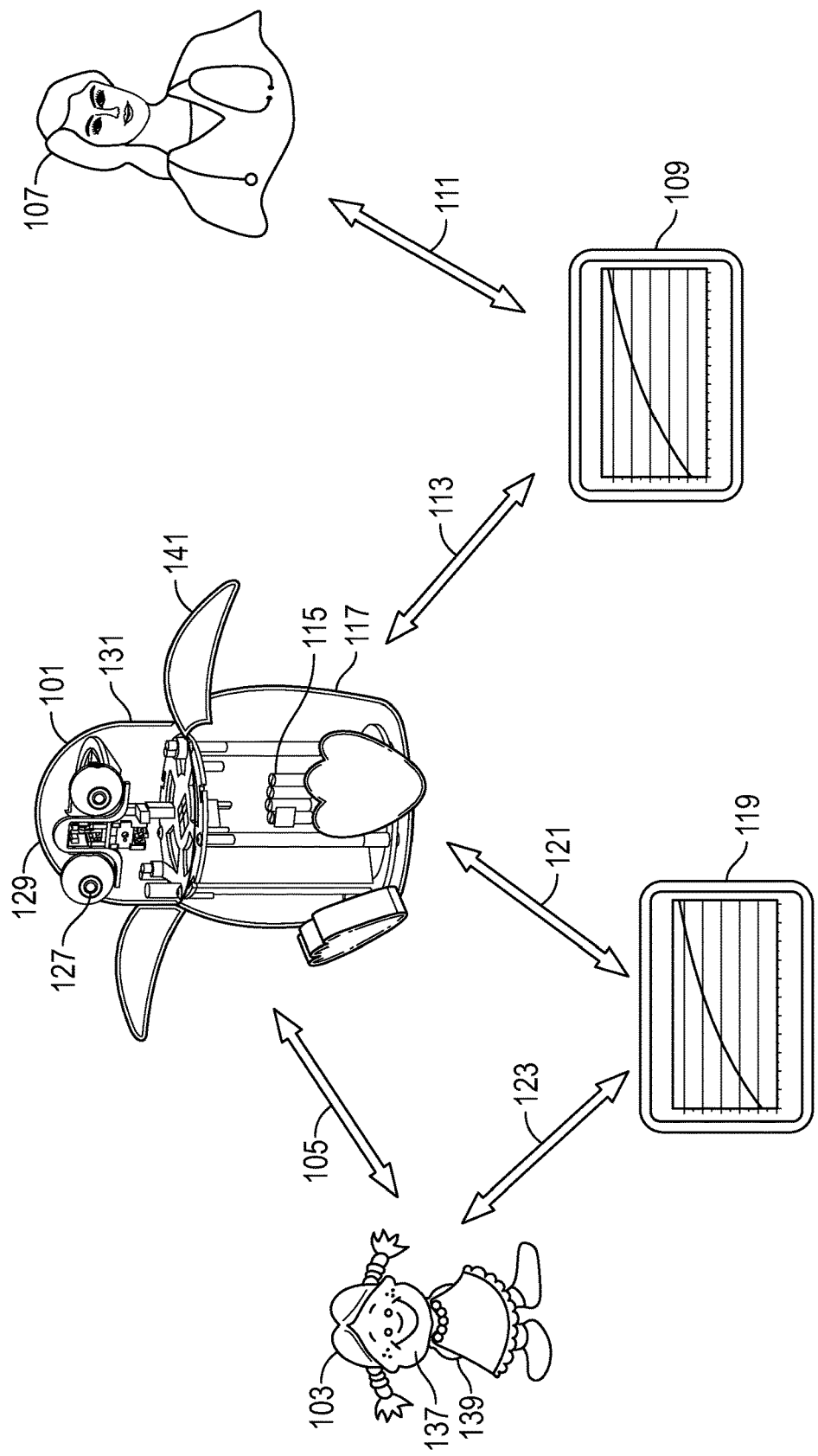
FIG. 1 depicts an overview of the system configuration of an embodiment of the invention where a robot interacts with a child under the supervision of a clinician.

The following detailed description is of the best currently contemplated modes of carrying out these teachings. The description is not to be taken in a limiting sense, but is made merely for the purpose of illustrating the general principles of these teachings, since the scope of these teachings is best defined by the appended claims.

The present teachings will be more completely understood through the following description, which should be read in conjunction with the drawings. In this description, like numbers refer to similar elements within various embodiments of the present disclosure. Within this description, the claims will be explained with respect to embodiments. The skilled artisan will readily appreciate that the methods, apparatus and systems described herein are merely exemplary and that variations can be made without departing from the spirit and scope of the disclosure. As used herein, the singular forms "a," "an," and the include the plural reference unless the context clearly dictates otherwise.

Except where otherwise indicated, all numbers expressing quantities of ingredients, reaction conditions, and so forth used in the specification and claims are to be understood as being modified in all instances by the term "about." Before describing the present teachings in detail, certain terms are defined herein for the sake of clarity.

The term "subject," as used herein, refers to a person interacting with the robot for therapy purposes. The subject can be, but is not limited to, one of infants, children, adolescents, adults, elderly, disabled, or veterans, in the text of this disclosure, the terms child and children are used as examples of subjects and refer to children with or suspected of being afflicted by a PDD such as autism spectrum disorder, Asperger's syndrome, or PDD-NOS, and fall under the definition of subject.

The term "supervisor," as used herein, refers to a person who is receiving the data for analysis or providing instructions for the interaction. The terms user, clinician, therapist, or supervisory users are used interchangeably with the term "supervisor" and refer to the person or persons who are directly operating or supervising the system. This person may be a teacher, psychologist, clinician, pediatrician, teacher, parent, other family member, friend, or other supervisor.

In some embodiments, the robotic system (also referred to as the robot) is described as interacting with children who are afflicted by or suspected of being afflicted by autism or autism spectrum disorder, it should be understood that this is an exemplary use and that in all cases the system may interact with children afflicted by or suspected of being afflicted by all forms or pervasive developmental disorders (PDDs) including autistic spectrum disorder, autistic disorder (autism), Asperger's disorder, childhood disintegrative disorder, and pervasive developmental disorder not otherwise specified (PDD-NOS) as detailed in the draft 5th edition of Diagnostic and Statistical Manual of Mental Disorders (DSM-V) anticipated to be published in 2013.

Disclosed, among other embodiments, are a system and a plurality of methods of utilizing this system for diagnosis, therapy, monitoring, and charting of PDDs including autism spectrum disorder. The system will assist in providing early diagnosis. The system will further assist in early intervention with robotic assistance, but will also be available for all age levels. It will be able to be utilized as an educational tool for both behavioral and cognitive therapy for a child during the academic year and outside of the academic calendar to provide continuous care at home, in school, in a clinic, or just anywhere else.

Autistic children have difficulty forming friendships and engaging in a simple conversational discourse. Theory of mind states a neurologically typical person has the ability to infer the full range of mental states including intentions, beliefs, attitudes, and emotions. It is believed that autistic individuals do not fully understand another's point of view, beliefs, attitudes, and emotions. In effect, individuals affected by autism may fall behind in social contexts and with interpersonal communication. Therefore embodiments of the current invention will help children socialize. In the current embodiment, a cartoon-like robot will look at children, make facial expression and utterances, track eye contact, and stimulate a social response in a non-threatening manner. The robot is small enough in size that the child can hold it, creating a physical connection which may enhance feelings of affection toward the robot, prolonging the child's interest in it. The modest size will also allow for easy transportation of the robot to increase generalization of social skills across settings. Moreover, the ability of the robot to monitor gaze and social cues may provide diagnostic utility.

One embodiment of the present invention embodiment includes a compact cartoonlike humanoid robot, integrated cameras that monitor human behavior, and a computer that recognizes human motion and facial features and interactively controls facial expression and movement of the robot. The system may be operated in several modes including, but not limited to: 1) fully autonomous, 2) semi-autonomous with supervisory control, and 3) teleoperatively (i.e. under remote control) from a local or distant site. In one embodiment, the system interactively or through post-processing assesses human motion and provides diagnosis information or charting or treatment progress. In one embodiment, the autonomous or semi-autonomous behavior adapts based on the treatment progress. Collected data is recorded and may be transferred via a portable memory device, through email, or through a network connection.

In one configuration, the robot's appearance reflects a non-threatening image of a penguin, which can be translated into a possible therapeutic intervention for children with PDD. Children with ASD have difficulty recognizing facial cues, and the robot will help the child to learn them. The present embodiment of the invention is a stand-alone portable device, not requiring a base, that a child or caregiver can carry around and can always be with the child to provide consistency.

The system will be configured to be developmentally appropriate and help with developmental milestones. It can be programmed for each child based on their current skill set and adjusted (either autonomously or by a therapist) to progress along with them. The robot may be configured to assist in reciprocal play. In one configuration, the robot will instruct the child on how to interact with another toy, in a further configuration, the robot will be monitor the child's play with another toy or object. The robot may be used in dyadic and triadic play or other therapy.

In one embodiment of the system, the robot will interact with the child utilizing and additional interface. In one configuration, the robot couples to a video game system and the interactions are led by or coupled to the game. In an alternate configuration, the robot has an integrated output and acts as a video game-type system and is coupled to an external or internal display and optionally an alternate user input device. The system will enhance the therapy by providing an entertaining way to reinforce the child's learning experience. The robot may act as a character in the game and serve as a companion for the child. The child may earn points in the game, further reinforcing skills.

The robot may communicate through non-verbal utterances to demonstrate emotions. In the present invention, the robot makes utterances that do not correspond to any specific language. Alternatively, the robot can speak to the child and lead specific tasks. This configuration may prove more useful for advanced therapy.

In one embodiment of the robot, the actuators are designed with compliance in the actuators to provide safety and robustness. To reduce actuator output impedance and mitigate unexpected external shock, a novel prismatic actuation method uses cables to convert rotary motor motion to linear motion to drive a piston with preloaded spring. This neck and eye structure is translatable to other human-safe humanoid robots.

The method of the present embodiment includes, but is not limited to extract and detect children motion and facial feature, automated charting children behavior, automated assessment of children progress, autonomous, semi-autonomous and teleoperated method of operation.

In an autonomous mode, the robot interacts with the child with no direct control by a clinician. In a teleoperation mode, a therapist, teacher, parent, or other user (either at a remote site or with the child) could observe the child's behavior through cameras and operate a joystick to control robot movement. In a semi-autonomous mode, the clinician controls the robot head movement while the eyes automatically track children movement. In either mode, the robot can further be used as a diagnosis tool to record children's behavior and automatically evaluate the treatment progress with one or more qualitative metrics.

A clinician side user interface displays video that may include a stereo camera view, robot status, child's progress according to parent or other caregiver feedback, automatic analysis and diagnosis of child response, behavior, and movement. Quantitative and qualitative assessment may be performed with the system. In one configuration, a score system would evaluate child's progress with one or more quantitative values and display this in a user interface. All these information may be recorded. The recorded information may be transferred to a portable memory device such as a USB key or transferred through a wired or wireless network connection.

A clinician, parent, teacher, or other supervisory user may control the robot using a remote computer interface, a gaming controller such as a joystick or Nintendo Wii Remote, a glove-like puppet interface, a tracking system that monitors the user motion, or other interface. In one embodiment, a puppeteer rig would allow control of the robot over a network for a clinician to lead diagnosis or treatment. Remote control could improve efficiency for clinicians and reduce costs while enabling more interventional time with children.

A clinician user can simultaneously observe multiple child-robot interactions through network, while the clinician user can selectively teleoperate one or several robots to interactively play with the child. While on the other side, the child can play with the robot with or without parent involvement. With the recorded video and data, the clinician user can review children status by selectively observing the video clip of interest based on the status score.

Face detection, body posture detection and tracking algorithm, like Kalman filter based method and Viola-Jones object detection framework, can be used to identify children head position, head orientation, facial expression, body movement, thus to control robot to interact with the children. The robot may monitor kinesthetic behaviors and recognize and classify motions.

The robot can change behavior and expression with children's progress. The robot can be used to play games with the child and act as a companion to convey communication or behavioral skills to the child.

A nest or other platform can be used as base station of the robot that contains one or more of the following: a power supply, a battery charger, a communication interface, additional processing, additional sensors or actuators. In one embodiment, the nest acts as a battery charger and a wireless communication link to the robot. It is then connected to an Internet or other network connection for remotely controlled interactions or for data transfer that may include an uploading of collected data to a supervisor, or a downloading of a new application to the robot.

The robot can also be utilized as companion with young people, those with psychological disorders, those with low brain function, elderly people, veterans including those affected by post-traumatic stress disorder (PTSD) or traumatic brain injury (TBI), disabled people, and other patient populations. In one embodiment the system incorporates wired or wireless sensing of physiologic parameters. In a further embodiment, the system records and/or interacts with a clinician to report on a patient's status, vital signs, medication usage, physical activity or other health related information.

The robot can be configured with various sensors, e.g. contact type or non-contact type electrocardiography sensor, to monitor vital life signs and report to clinician center.

An embedded speaker and/or display can be used to remind robot user to take medicine, or to remind the parents to help children take medicine.

Motion sensing input device such as the Microsoft Kinect, stereo cameras, or other tracking systems can be used as motion sensing sensors to monitor children behavior.

The present invention may be utilized in a home setting, in a school, in a medical with a therapist, or in a pediatrician's office, Not all aspects of the present invention may be incorporated into all embodiment of the invention.

One embodiment of the robot for interacting with children affected by PDD is low-cost, compact, easy to use system that can be used in the traditional school and clinic setting, but also brought home for enhanced continuous care. Although in one embodiment the robot is designed for interacting with children with PDD including autism, it is understood that the robot more generally may interact with a patient other than a child, and may be used in cases other than therapy or diagnosis of PDD. The robot will be able to be used as an autonomously acting "toy" to play with and interact with as described in by Robins et al. (B. Robins, N. Otero, E, Ferrari, and K. Dautenhahm, "Eliciting requirements for a robotic toy for children with autism," in Int Symp Robot and Human Interactive Communication, pp. 101-106, 2007, which is incorporated by reference herein in its entirety and for all purposes). In a teleoperated mode, a clinician can operate the device remotely (from within the same room or a remote site) and control the robot's motions while receiving video and audio streams. In this mode the robot may be fully teleoperated or act semi-autonomously. In a diagnosis mode the robot can not only interact with the child, but also monitors the child's body and eye motions to assist in quantitative assessment. This assessment can be run independently or during other modes of operation. Assessment may be used for initial assessment of a patient (i.e. child). The initial assessment may include evaluation based in whole or in part on a standard metric or test such as, but not limited to, the Childhood Autism Rating Scale (CARS), Gilliam Autism Rating Scale (GARS), and Autism Behavior Checklist (ADC). Alternatively, continuous assessment may be used for quantitative charting of progress. The continuous assessment or charting measuring changes in response to treatment may include evaluation based in whole or in part on a standard metric or test such as, but not limited to,) the Autism Treatment Evaluation Checklist (ATEC). The assessment may evaluate treatment progress in one or more areas including, but not limited to, speech/language/communication, sociability, sensory/cognitive awareness, and health/physical/behavior. This continuous assessment can be used to update and modify the robot's autonomous behavior as the child's level of interaction improves. Often the first diagnosis of PDD is by a pediatrician and the system may be utilized for quantitative diagnosis in an office setting. It may be further used as a preliminary screening to triage children waiting for formal assessment by a trained professional thus improving early diagnosis and speeding the process towards early intervention.

In one or more embodiments, the robot of these teachings includes a number of actuators, a number of sensors, interaction inducing components (such as, but not limited to, movable eyelids, movable appendages, sound generating components) operatively connected to at least some of the actuators, a control component operatively connected to the actuators and a processing component operatively connected to the control component and to the sensors; the processing component comprising computer usable media having computer readable code embodied therein that instructs a processor in the processing component operate the interaction inducing components according to predetermined instructions and obtain data from interaction between a subject and the robot, wherein the data is used for diagnosis and/or charting progress.

FIG. 1 depicts one embodiment of the robotic system in an exemplary therapeutic scenario. Robot 101 may take the form of a compact humanoid, wherein the term humanoid refers to any configuration that maintains features of actual or fictional human, human-like, animal, or fantasy characters such as, but not limited to, eyes, a head, and appendages. The robot interacts with the patient 103 through interaction 105, wherein the patient may be a child affected by a PDD, or it may be from another population including but not limited to infants, children, adolescents, adults, elderly, disabled, or veterans. Interaction 105 may take the form of various means, including, but not limited to, physical gestures, auditory stimulus including sounds, utterances, music, or speech, and incorporation of external interfaces. The interaction 105 may be unidirectional in either direction, or it may be interactive between robot 103 and patient 103. In addition the interaction may include one or more third parties.

Supervisory user 107 (also referred to as supervisor) may be a clinician such as pediatrician or therapist, or may be a parent, teacher, or other person assisting with the therapy course. The supervisory user may be in the same room as robot 101 and patient 103, or may be at a remote location. The supervisory user may use a user interface 109 to control and/or monitor the robot and the patient through interface 111. In one embodiment, user interface 109 is a tablet computer and through interaction 111 the user can view information about the therapy and command actions of the robot 101. User interface 109 may have a touch screen, or it may take the form of computer workstation or an internet web page interlace to the robot. User interface 109 may take the form of an Apple iPad or other iOS device, an Android OS device, mobile Windows device, or other similar device. Further, user interface 109 may be a custom control unit for the robot. In one embodiment, user interface 109 includes a joystick, motion capture system, 3D user input device, haptic device through which interaction 111 is employed. In one configuration user interface 109 include a puppet-like device that mimics motions of robot 101 and interaction 111 allows control of robot 101 through hand gestures, in alternate embodiments of the system, the robot operates autonomously and does not require a live supervisory user 107. A supervisor user 107 may log in remotely to retrieve data collected during the therapy session.

User interface 109 is communicatively coupled to a robot controller 115 through connection 113. Connection 113 may be wired or wireless, in one embodiment, connection 113 is a network connection to a remote site such as an Ethernet connection, cellular connection, Wifi, or other approach. For local connections, a peer to peer communication method such, but not limited to, Bluetooth, Zigbee may be used, alternatively a direct cable connection including, but not limited to, Ethernet, USB, or Firewire, may be used. In one embodiment, robot controller 115 resides inside body 117 of robot 101. In a further embodiment, robot controller 115 is comprised of a computer and a sensor and actuator interface unit. In an alternate embodiment, robot controller 115 comprises only a sensor and actuator interface unit that resides inside body 117, and the higher level control functionality is performed on an external device such as user interface 119. In an embodiment of the invention, robot 101 may also user a patient interface 119 device that is communicatively coupled to the robot through connection 121, directly to a user interface 109, or to an alternate control system. It should be understood that presented are example configurations, and that both patient interface 119 and user interface 119 may be displays or touch sensitive displays connected to internal controller 115, or configured in other various means. Interaction 123 with the child may be instructions, a game, or a therapeutic scenario. In one embodiment, the system is configured to provided ABA therapy using a touch sensitive screen on patient interface 119, wherein patient interface 119 may take the form of a tablet, touch screen computer, or other touch sensitive interface. Patient interface 119 may be a standalone device couple through similar means as described for connection 113 to user interface 109. In an alternate embodiment, patient interface 119 is embedded into body 117 of robot 101. In an alternate embodiment, interface 119 is a gaming system or similar device that child 103 interacts with through interface 105, wherein interface 105 may be a joystick, pointing device, touch sensitive mat, or 3D tracking system such an RGB-D device or stereo camera system.

Robot 101 may interact with the patient 103 through various means. In one embodiment, robot 101 has cameras 127 located in robotically repositionable eyes 129. Eyes 129 mount in or on robotically repositionable head 131 which is attached to body 117, in one embodiment, a pair of two cameras 127 are mounted in a pair of eyes 129, and stereo vision techniques may be applied using known information about eye 129 and head 131 configuration with respect to body 117. The one or more cameras 129 may be used to visualize the patient 103, and processing of images from cameras 127 may take place in a computer of robot controller 115 or at an alternate or remote location. The cameras 127 may be used to provide information about the location of patient 103 with respect to the robot. Further, cameras 127 or corresponding image processing software may be used to provide information about facial expression and gaze direction 137 of patient 103. Cameras 127 or corresponding image processing software may be further used to provide information about the patients affect or motions 139. Interaction 105 may also include touch sensors on the robot body 117 or other tactile feedback. Further the robot 101 is configured to have one or more microphones for recording, analyzing, and localizing sounds sources in the case of at least two sensors. The robot is configured to have an auditory response including sounds, utterances, or verbal cues through one or speakers in body 117 or head 131. The robot may further interact with patient 103 through controlled motion of appendages 141. The appendages may be used for pointing, instructing, showing emotion, or other purposes. Similarly, the head and eyes may also be sued for these purposes. Additional controlled robot motions may include, but are not limited to, eyelids, eyebrows, feet, mouth, and dexterous manipulators such as hands. In one embodiment of the system, the system may be configured such that interaction 105 includes providing positive reinforcement to a child 103 during ABA therapy. The positive reinforcement may take the form of candy or other treats, toys, music or videos, a positive robot response, or other means.

Figure 2:
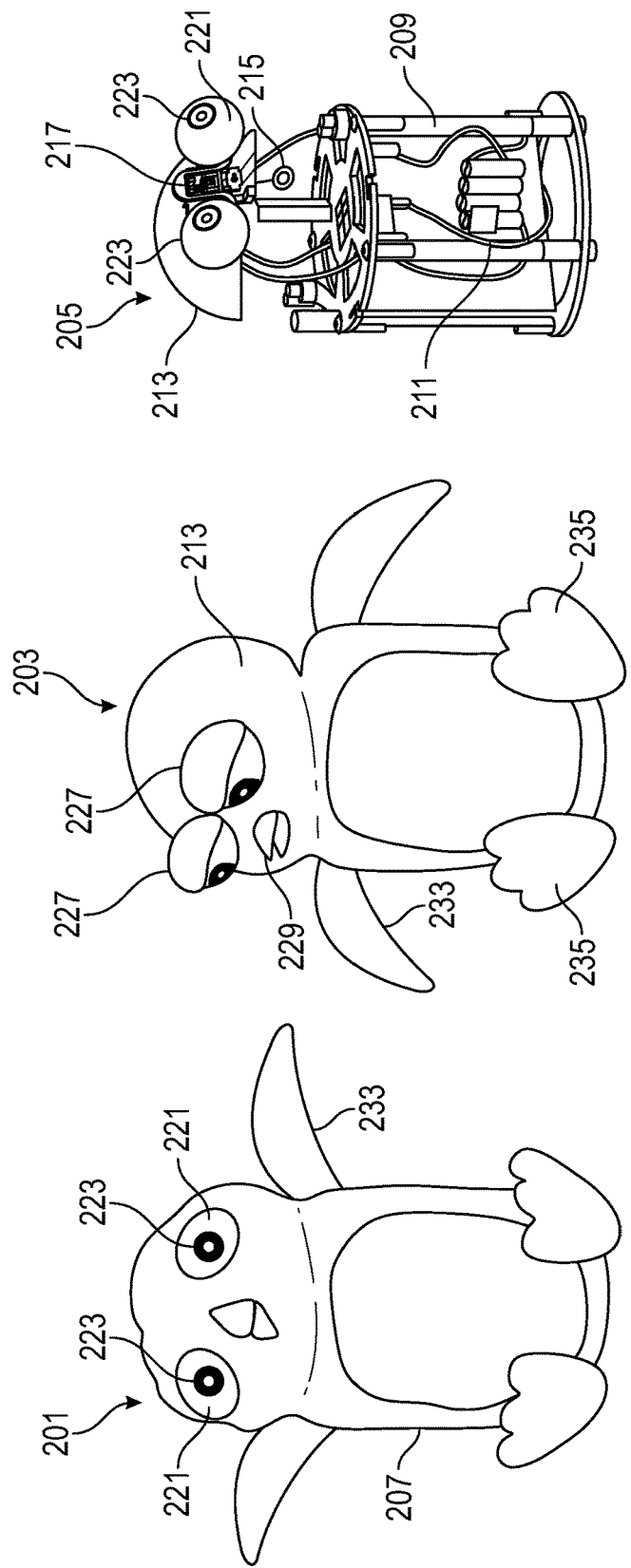
FIG. 2 depicts the exterior and interior appearance of one embodiment of a robot that takes the form of a cartoon-like penguin.

In one embodiment, the robot takes on the form of a cartoon-like penguin. This enables the use of human-like emotions, while maintaining a simple and non-threatening profile. The exterior appearance 201 and 203 for two configurations and interior appearance 205 of an embodiment of the robot are shown in FIG. 2 for the robot referred to as Penguin for Autism Behavioral Intervention (PABI). The robot is shown in two states 201 and 203 that represent possible configurations for presenting emotional responses. In this embodiment, the exterior shell 207 of the body is mountable to an internal frame 209. Protected inside frame 209 is the robot controller 211 which contains a computer and servo motor controller. Attached to body frame 209 is articulated head 213. In this embodiment, the had has three degrees of freedom actuated by servo motors 215. Alternate embodiments may have more or less degrees of freedom for the neck, and may be actuated by other means. Attached to head 213 is an articulated eye mechanism 217 that provides a coupled tilt for eyes 221. Additional servo motors inside eyes 221 provide independent pan motions. Alternate eye configurations may be used in other embodiments of the robot. Inside of each of eyes 221 are cameras 223 that are connected to the robot controller 209, in an alternate configuration, visual information can be acquired from cameras in other locations on the robot or from external vision systems. It should be understood that the terms camera and vision system may refer to a traditional camera, stereo cameras, RGB-D or other 3D cameras, ultrasonic range finder, laser, infrared, other optical scanners and range finders, or other sensing means. Additionally, commercially available eye tracking systems, face tracking systems, or motion trackers such as a Microsoft Connect may be integrated into the robot or used externally, Eyes 227 may take on a cartoon-like appearance. Eyes 221 may have upper, lower, or both eyelids 227, Head 213 may also incorporate eyebrows or other motions to improve emotional response representation. Mouth or beak 229 may be synchronized to audio output from the robot including singing, utterance, or speech. Appendages 233 may be actuated with one or more degrees of freedom each. In one embodiment, wings 233 are each actuated directly by a servo motor. Alternately, cable driven approaches may be used to actuate the appendage 233. In one embodiment, feet 235 are attached to body 207, and like the rest of the robot surface are made of a soft compliant tissue to encourage interaction with a child, particularly an autistic child who may have an affection for soft objects. The feet may be actuated.

Figure 3:
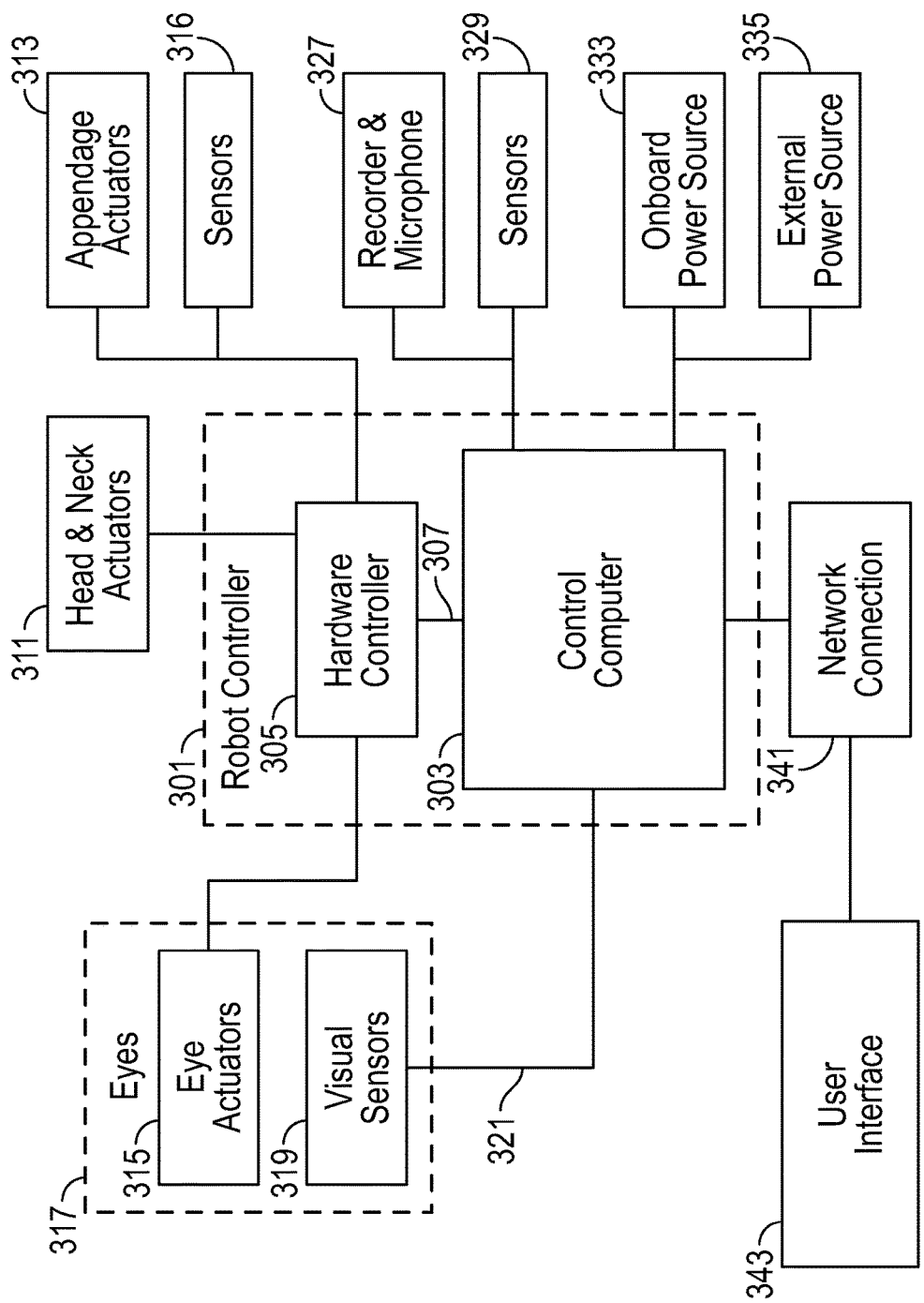
FIG. 3 depicts a flowchart illustrating a block diagram of the robotic system's components in one embodiment.

In one embodiment, as shown in FIG. 3, the robot comprises a robot controller 301 that further comprises an onboard control computer or processing component 303 that may be a single board computer, microcontroller, or other processing unit. The computer 303 serves as the robot's computational core that may be used for robot control, image processing, networking, data storage, and peripheral interfaces. In one embodiment, a hardware controller module 305 is communicatively coupled with the computer 303 through connection 307. In one embodiment, hardware controller is a servo motor controller for commanding the actuators that communicates with the computer over a USB, serial, Ethernet, or other connection 307. In a further embodiment, a hardware controller with additional capabilities such as controlling actuators and interfacing with sensors is utilized, such as a National instrument multi-function DAQ system or a Neuron Robotics DyIO, in an alternate embodiment, the robot has limited onboard computational power and the servo controller receives control signals through a network which may take advantage of cloud computing resources. The robot contains a plethora of actuators, which may be servo motors or other actuation technologies that are controlled by the servo controller or another hardware controller interface 305. The actuators control motion of at least one of: head and neck 311 including mouth or beak and facial expressions, appendages and body configuration 313, and eyes 315 including eyelids and eyebrows. The controller, computer, or other hardware interface also interfaces with a plethora of sensors which include, but are not limited to: camera, stereo cameras, range or proximity sensor, accelerometer, vibration sensor, gyroscope, inertial measurement unit, microphone, stereo audio localizers, touch sensors, pressure sensors, temperature sensors, buttons, and other sensing modalities or configurations. These sensors may interface with the hardware controller 305 as depicted by 316, directly to the control computer 303, or directly to an outside monitor such, but not limited to, as a wireless camera system. In one embodiment, the eye and associated actuates 315 reside inside or otherwise coupled to the eyes 317. The eyes 317 incorporate one or more visual sensors 319, which as described earlier may be cameras or other forms of sensing the environment around the robot. In one embodiment, visual sensors 319 are stereo cameras, one in each eye, that are communicatively coupled to the control computer 303 through a USB or other connection 321. The robot may include audio and video recording and analysis. The robot may also include speakers for audio output, in one embodiment, the robot is configured to sense audio through one or microphones and emit audible output through one or more speakers 327. Alternatively, audio sensors in eyes 317 may be utilized, for example if 319 represents a USB webcam that provides visual and audio information. Additionally, sensors 329 may be coupled directly to the control computer as described previously. The robot may be powered by an onboard power source such as an internal battery 333. Alternatively, the robot may be powered through an external power source 335. In one embodiment the external power source serves as a charger, is readily switchable between internal and external power supply. In a further embodiment, the external power source is contained in a nest or dock that the robot is placed into. One embodiment of the robot has a display for visual output. The robot may be connected via a wired or wireless network 341 to another robot, a stand-alone control interface, or a centralized control interface. The robot may be operated locally or remotely, and optionally through the use of a supervisory user and/or patient user interface 341.

Figure 4:
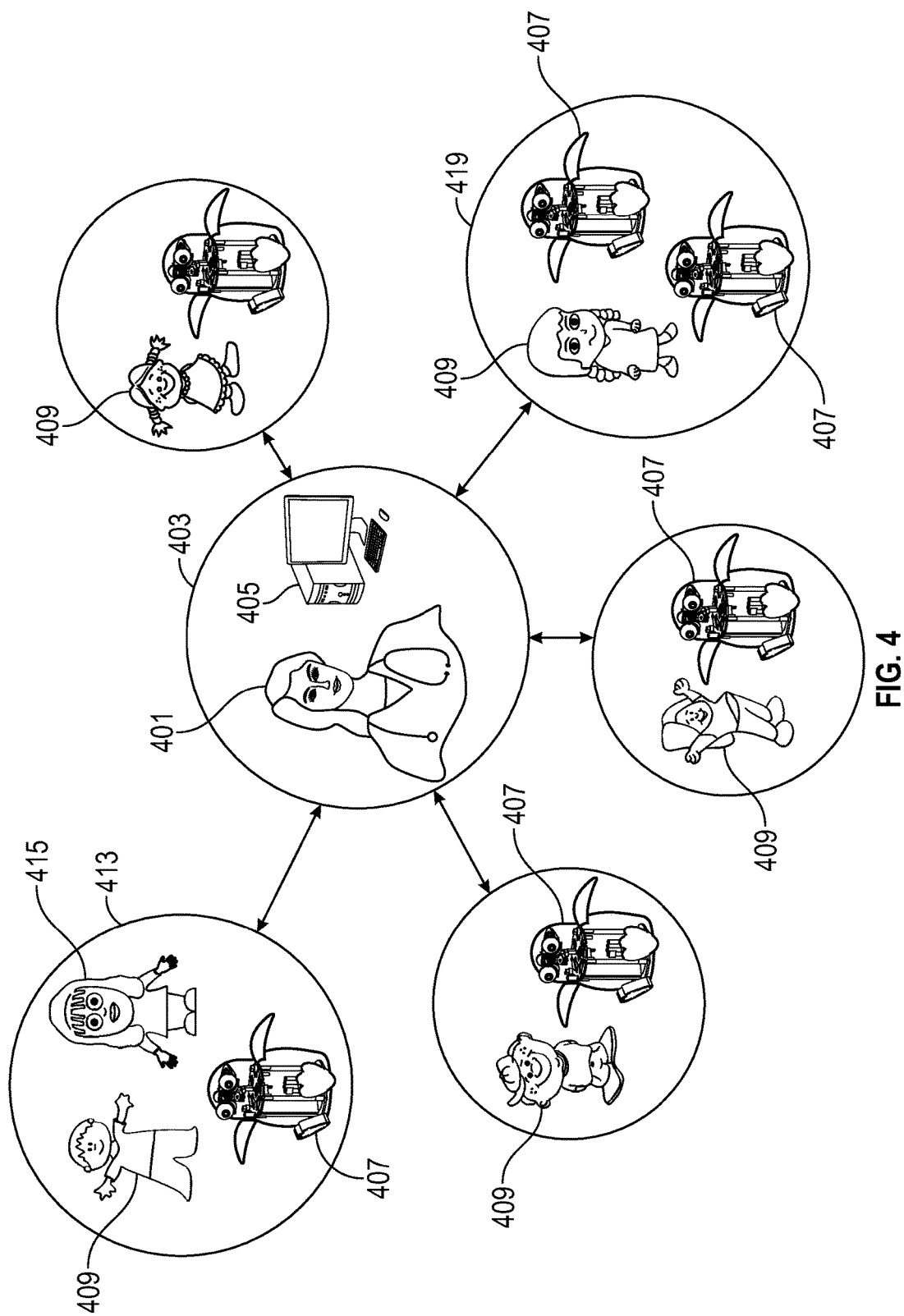
FIG. 4 depicts a flowchart illustrating an exemplary scenario of a clinician using a computer to observe and/or interact with a network of one or more of the robots.

As shown in FIG. 4, a clinician, pediatrician, teacher, or other supervisory user 401 can simultaneously observe one or more child-robot interactions through a network 403 through a supervisory user interface 405, while the clinician user 401 can selectively teleoperate or otherwise interact with one or more robots 409 to interact with children or other patients 411. The child can play with the robot with or without involvement of a parent or another person. Scenario 415 depicts one or more additional people 415 present with the robot 407 and child 409. The person 415 may be a parent, teacher, therapist or other clinician, or another child. Scenario 419 depicts more than one robot 407 interacting with the one or more children 409 or other people. The robot 407 may be the same, similar, or disparate types and configurations. With the recorded video and data from robot 407 or other external interfaces, a clinician user 401 can review a child's status by selectively observing on interface 405 the video clip of interest based on a status score. Review of video can be live or through post processing. Robots 407 may act independently reporting information back through network 403 in real-time, or may locally store information that can later be transferred through the network 403 or through other means such as a portable storage device, email, or other means. Alternatively, robots 407 may be teleoperatively controlled by one or more supervisory users 401 or provided remote guidance commands for semi-autonomous operation. Interface 405 may be a computer workstation, tablet computer, internet web page, or other interface.

Figure 5:
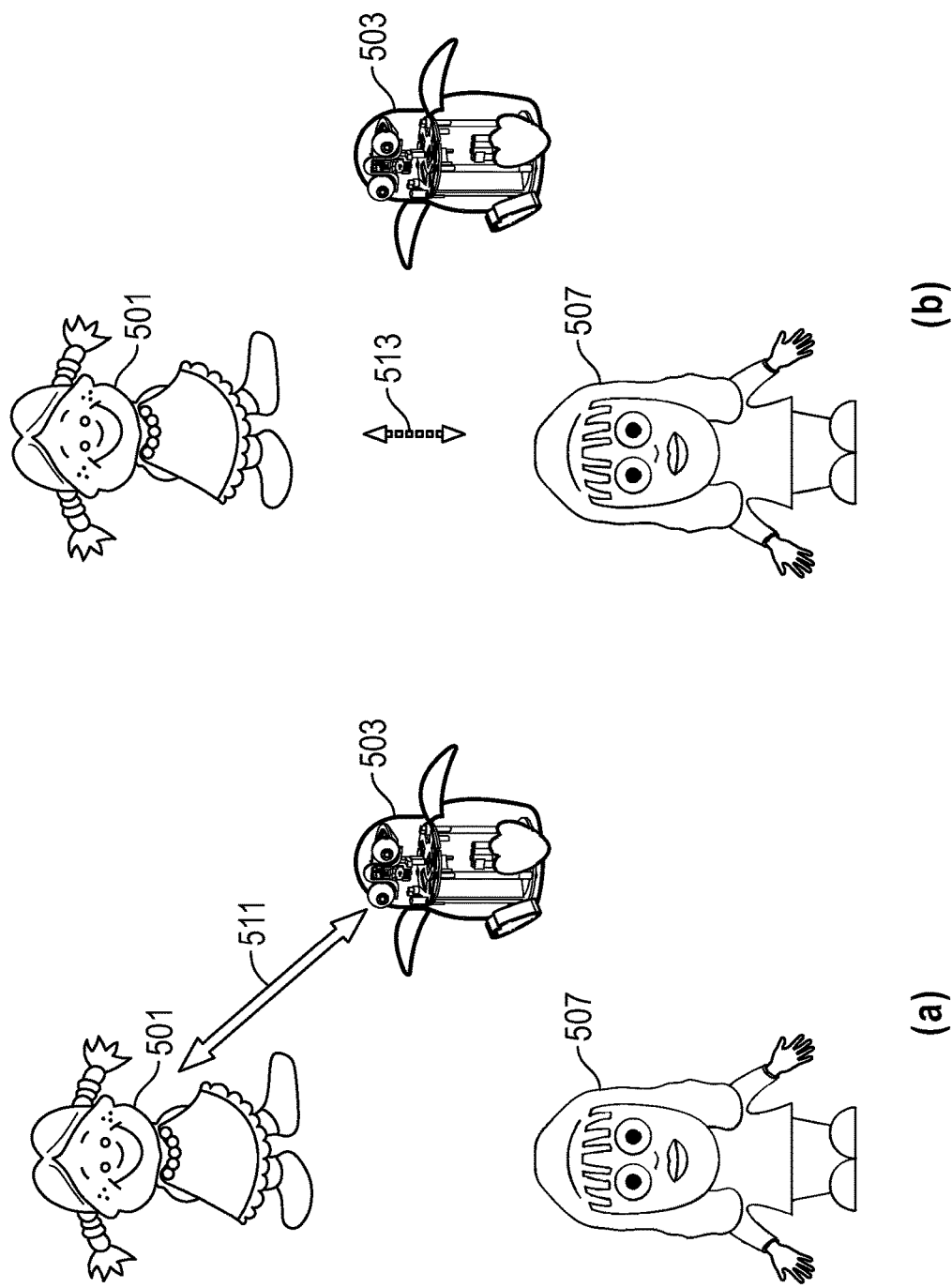
FIG. 5 depicts an exemplary scenario where a child interacts with a robot, while a parent, teacher, or clinician utilizes the robot to supervise the child's communication and learning experiences, this capability can facilitate transfer to interaction of the child with other people.

In one embodiment, as shown in FIG. 5a, a child 501 plays or otherwise interacts with a robot 503, while a parent, teacher, or clinician 507 utilizes the robot to supervise or guide the child's communication, behavior or learning with the robot. As shown in FIG. 5b This habitually enforced or naturally learned capability with the robot 511 can be transferred to child-child or other child-human interactions 513. The system may be utilized as a social interaction to assist the child in play appropriate behavior. The robotic system may provide interventions to assist child parent interactions, and is not limited to traditional play therapy. The robot 503 may be configured to assist in reciprocal play. In one configuration, the robot 503 will instruct the child 501 on how to interact with another toy. In a further configuration, the robot will monitor be child's play with another toy or object. The robot 503 can engage all members of the child treatment team to assist the child to feel autonomous. In one mode of operation, the robot 503 will autonomously mediate play 511 between the child, robot, and one or more other objects or toys. The robot may be used in dyadic and triadic therapy In some embodiments of the robotic system (also referred to as the robot), the computer readable code instructs the processor to communicate with a process in an interface external system having a display, the interaction between the robot and the subject including an interaction between the subject and objects displayed on the display and generated by the process operating in the interface external system.

Figure 6:
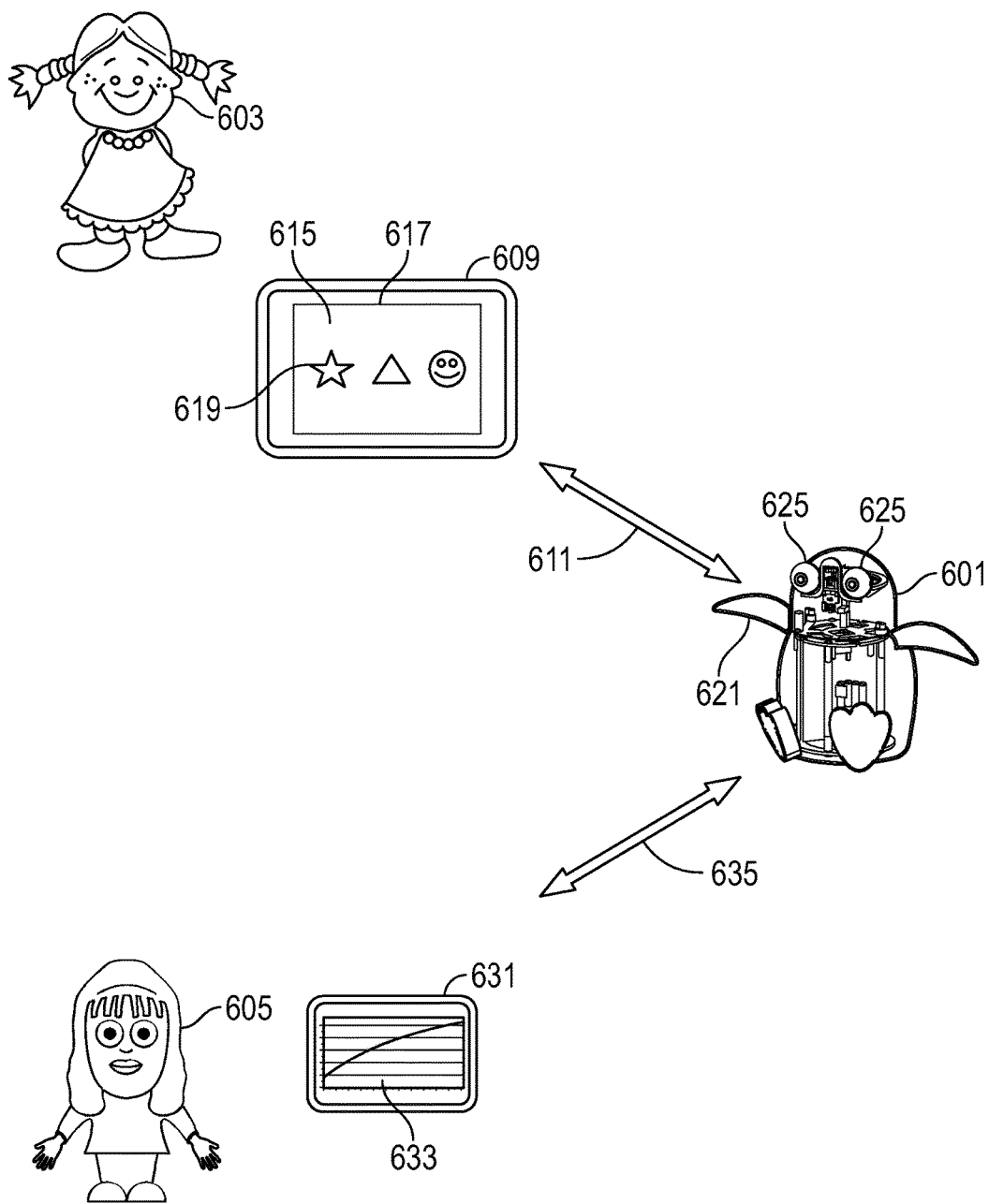
FIG. 6 depicts an exemplary scenario where a robot assists in applied behavioral analysis (ABA) therapy with a child.

FIG. 6 depicts a configuration of the robotic system for taking part in applied behavioral analysis (ABA) therapy. For this application, robot 601 interacts with child 603. This interaction may be alone, or in the presence of another person 605 such as a therapist, parent, or teacher. In one embodiment, a user interface 609 is a touch screen computer or tablet computer such as an iOS including an Apple iPad, an Android OS device, mobile Windows device, or similar device. Tablet computer 609 runs an application 615 that displays on a touchscreen 617. The computational intelligence behind the application and the robot including a therapy script may primarily operate from the interface 609, within the robot 601, or a remote resource. Robot 601 is communicatively coupled 611 to interface 609 through wired or wireless means. In one embodiment where the robot is configured to assist in ABA therapy, objects 619 are displayed on touchscreen 617. The child 603 is instructed by the robot 601, interface 609, or clinician 605 to touch a specific object on touchpad 617 and that touch is identified by tablet computer 609. Alternatively, the application 615 instructs the child to perform some behavior in a physical space, and cameras 625 or other visual systems on the robot 601 or elsewhere record and analyze the behavior, Robot 601 may communicate with the child 603 through auditory commands, or may use motions of appendages 621 or other body gestures. The robot may provide positive or negative reinforcement through body motions, gestures, and sounds. The robot may also provide or control distribution of positive reinforcement which may include distributing or presenting candy, toys, music, video or other means. The therapy may be autonomous, or may be controlled from a supervisory interface 631 which runs a corresponding application 633. The supervisory interface 631 communicates with the robot 601 through 635 which may be wired or wireless. Communication coupling 635 may be local for in-room or on-site control of the session, or may be remote. The system may record the session and be used to provide quantitative metrics and assistance in charting a child's progress. The system may also be used in diagnosis or needs assessment.

Figure 7:
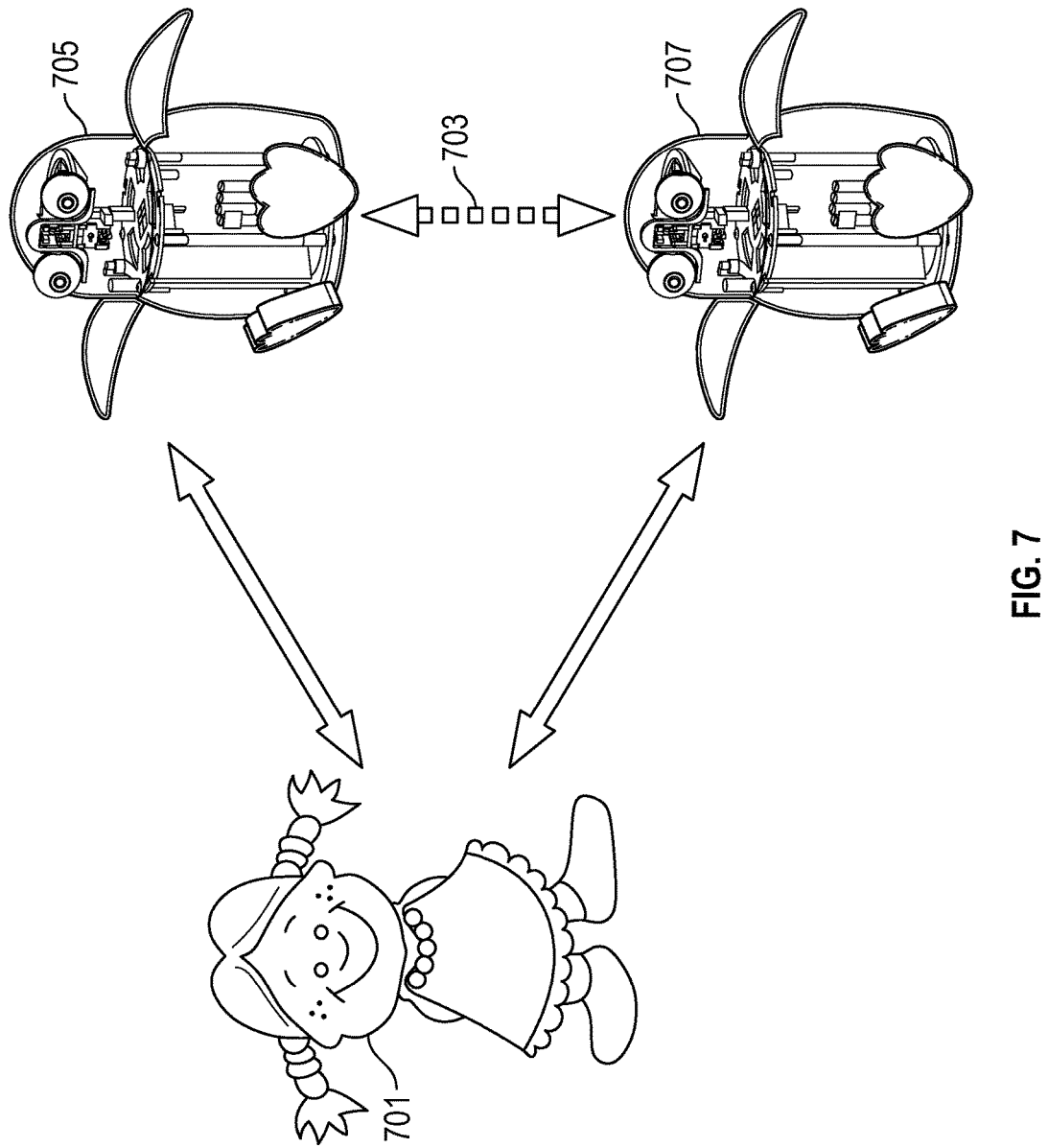
FIG. 7 depicts an exemplary scenario where a child observes interaction between two or more robots, or at least one robot and one or more people, to learn behaviors.

In one embodiment, as depicted in FIG. 7, a child 701 observes interaction 703 between two or more robots 705 and 707, or at least one robot and one or more people, to learn behaviors. In one configuration, one child plays with multiple robots to observe robot-robot interaction or to play games with multiple robots.

Figure 8:
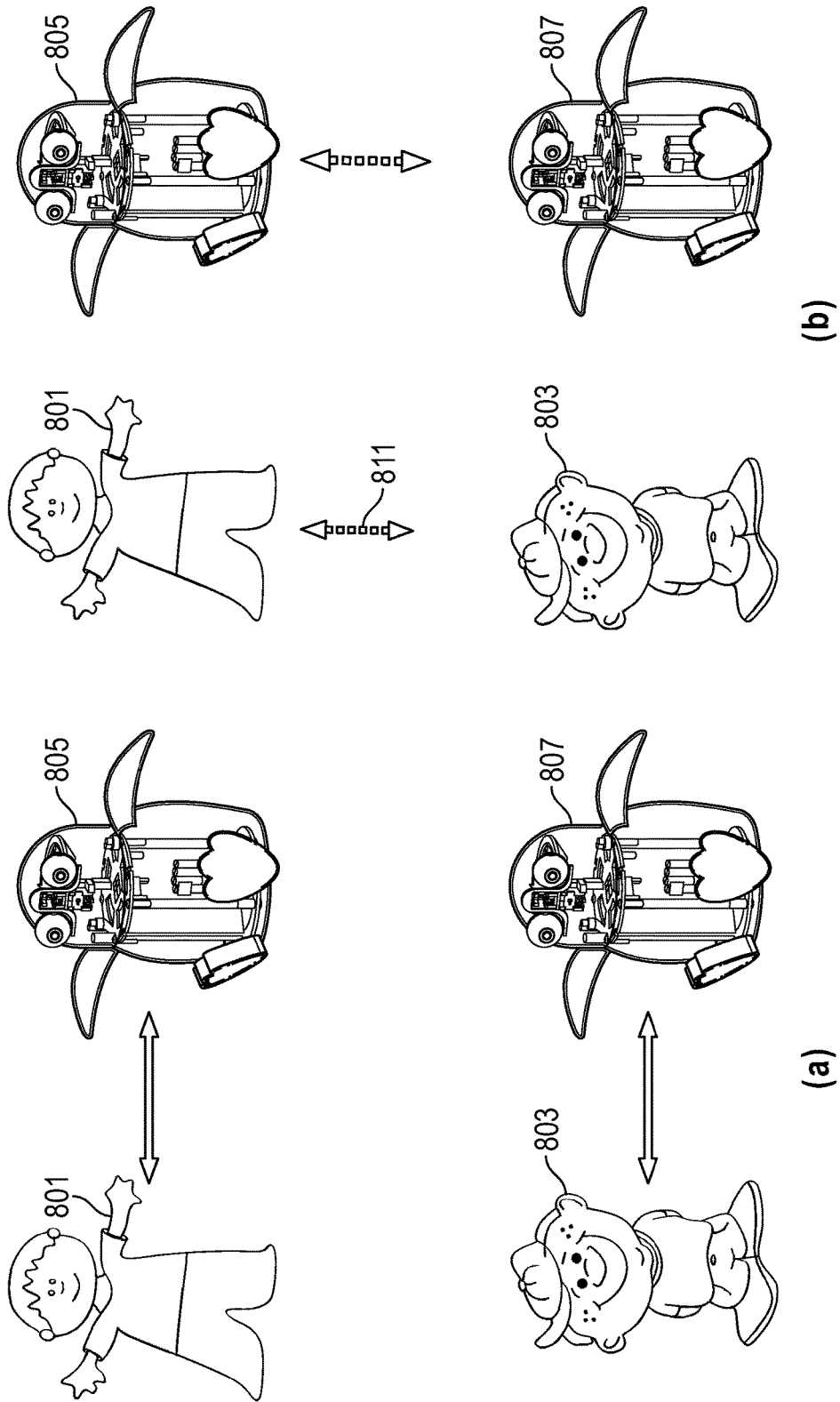
FIG. 8 depicts an exemplary scenario where children interact with, or observe interaction between, multiple robots and then transfer the learned communication ability or behaviors to interact with other children or adults.

In one embodiment, as depicted in FIG. 8, two or more children 801 and 803 interact with, or observe interaction between, multiple robots 805 and 807 and then transfer the learned communication ability or behaviors for interaction with other children or adults 811. Skills learned from each human-child pair interaction can be transferred to communicate and interact with other children.

Figure 9:
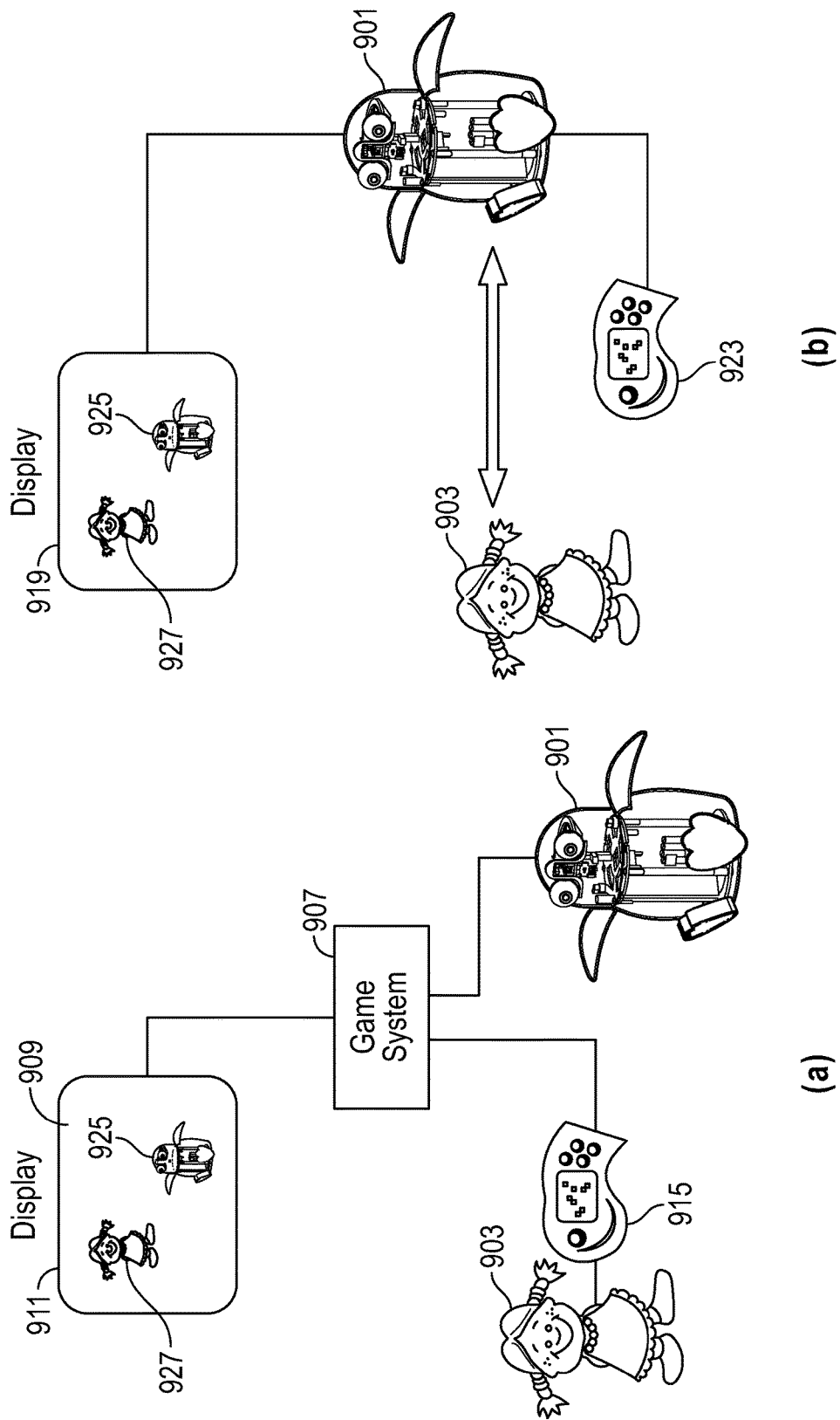
FIG. 9 depicts one embodiment of the system, wherein a robot interacts with a child utilizing an additional interface such as a video game.

FIG. 9 illustrates one embodiment of the system, wherein a robot 901 interacts with a child 903 utilizing and additional interface. In one configuration, depicted in FIG. 9a, the robot couples to a video game system or similar device 907 and the interactions are led by or coupled to a game or other software application 909 shown on display 911. The child 903 may interact with the system through a user interface 915 that may take the form of a video game controller, a tablet computer as described earlier, a custom device, or other interface. In an alternate configuration, depicted in FIG. 9b, the robot 901 has an integrated output and acts as a video game-type system and is coupled to an external or internal display 919 and optionally an alternate user input device 923. This embodiment enables interaction with the child both physically and in an on-screen environment 909. The system will enhance the therapy by providing an entertaining way to reinforce the child's learning experience. The robot miry act as a character in the game 925 along with the child's avatar 927 and possibly those of others including family members and friends, and serve as a companion for the child. The child may earn points in the game, further reinforcing skills. In one configuration, the system is networked to allow a clinician or another user to participate in the "game". In a further embodiment, multiple systems may interact in an online environment and multiple children may interact with a combination of each other, clinicians, their robot, and other virtual entities. In one embodiment, the robot and child may act as participants in a multi-player online gaming environment. In a further embodiment, a similar system may be utilized as a gaming interface not necessarily for children or those affected by PDDs.

In one or more embodiments, the system of these teachings for observing/analyzing interactive behavior includes a robot having a number of actuators, a number of sensors, interaction inducing components operatively connected to at least some of the actuators, a control component operatively connected to the actuators and a processing component operatively connected to the control component and to the sensors; the processing component comprising computer usable media having computer readable code embodied therein that instructs a processor in the processing component to communicate with a process in at least one external system, operate the interaction inducing components according to predetermined instructions and obtain data from interaction between a subject and the robot, wherein the data is used for diagnosis and/or charting progress, and an external system configured to communicate with the robot, the external system having a supervisory processing component configured to communicate with the robot, the supervisory processing component also configured to obtain data from interaction between a subject and the robot; the supervisory processing component also configured to use the data for diagnosis and/or charting progress, and a display operatively connected to the supervisory processing component.

Figure 10:
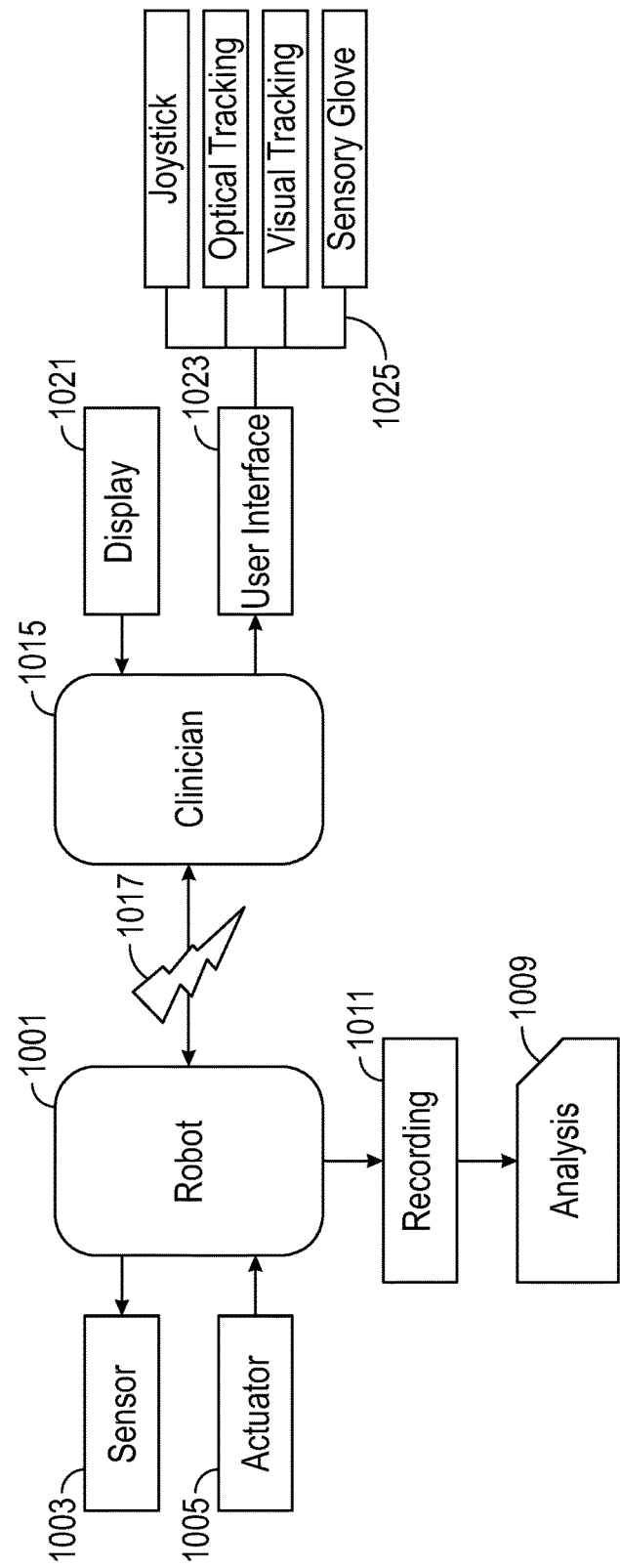
FIG. 10 illustrates an embodiment of the system architecture. A robot is equipped with one or more sensors, actuators, processors and recording modules, while a remote or local clinician or supervisory user is equipped with a controller incorporating a communication interface, a display, and a user interface to observe and interact with child behavior and control robot motion.

FIG. 10 illustrates an embodiment of system architecture. A robot 1001 is equipped with one or more sensors 1003, actuators 1005, processors 1009 and recording modules 1011, while a remote or local clinician or supervisory system 1015 is equipped with a controller (including the supervisory processing component) incorporating, a communication interface 1017, a display 1021, and a user interface 1023 to observe and interact with child behavior and control robot motion. In one configuration, the robot 1001 is equipped with sensors, actuators and recording modules, while the remote or local clinician or supervisory user is equipped with display and user interfaces to observe children behavior and control robot motion. The user interface 1023 may comprise or couple to one or more of the following devices 1025: optical motion tracking device, visual motion tracking device (e.g. Microsoft Kinect), joystick, game controller (e.g. Nintendo Wii Remote), gamepad, and sensory glove. Further, the interface device 1025 may comprise a puppet-like master controller device that mimics the motions of robot 1001.

Figure 11:
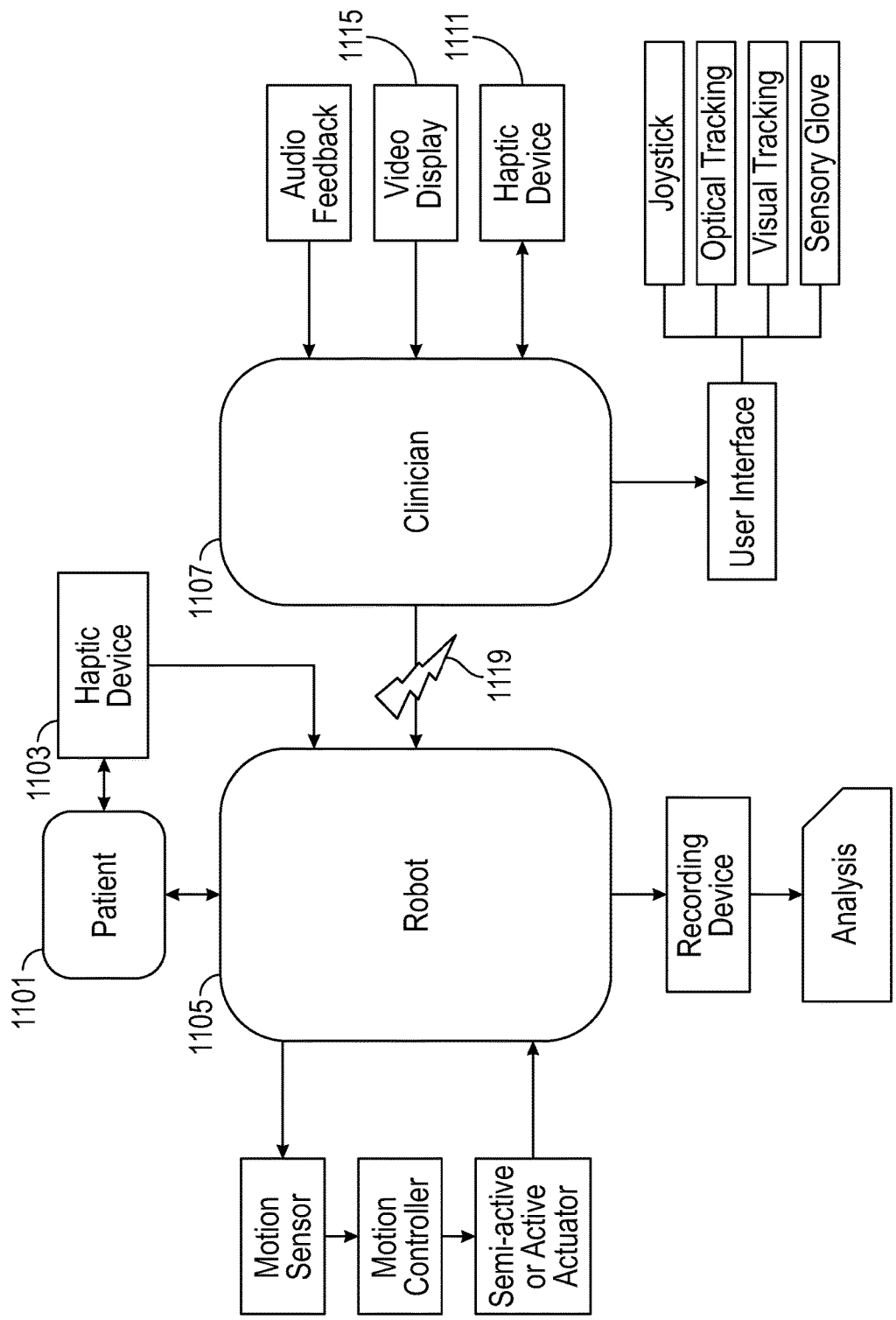
FIG. 11 illustrates an embodiment of the system architecture, wherein a robot is further equipped with a haptic or tactile interface for interacting with a patient and a clinician is provided with a haptic or tactile interface.
Figure 12:
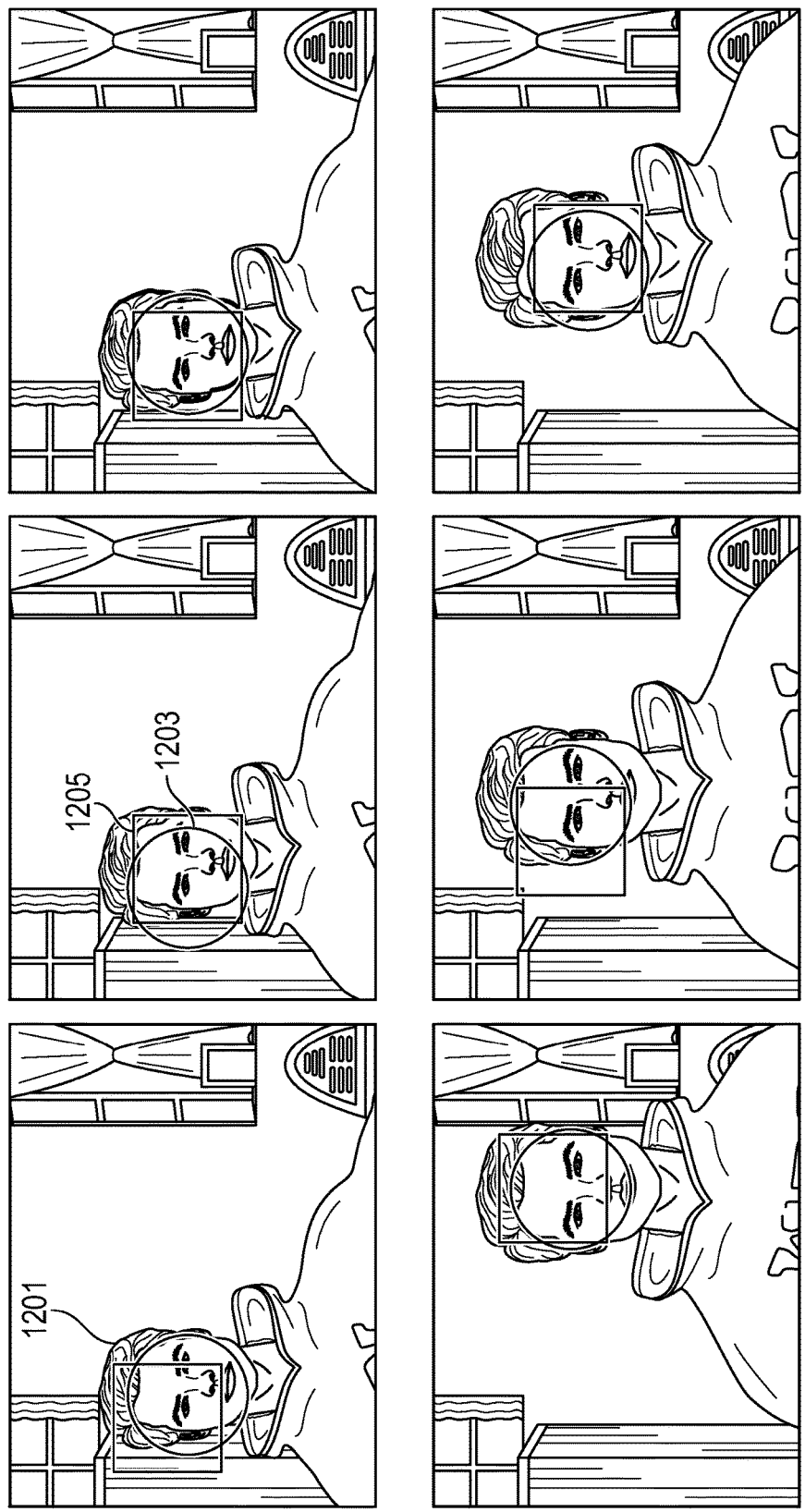
FIG. 12 depicts tracking sequences of a face with superimposed circles showing the position measurement and black squares showing the estimated position after applying a tracking filter algorithm.

In a further embodiment, depicted in FIG. 11, a subject, typically a child) 1101 manipulates a haptic device 1103 to learn a force evolved activities. A haptic device is defined an electromechanical equipment that provides force or tactile perception. It may be used in the process of recognizing objects through touch, and this perception involves a combination of somatosensory perception of patterns on the skin surface (e.g., edges, curvature, and texture) and proprioception of hand position and conformation. In a teleoperation mode of the robot 1105, a child or other patient 1101 learns the haptic profile based on the motion and force guide from a clinician 1107 who manipulates a haptic device 1111 on his/her side, in a haptics mode, the child 1101 learns a preprogrammed haptic profile based on the motion and force guide from a computer in the robot 1105, which could be in the form of games, exams or test. Either the interactive learning in the teleoperation mode or repetitive learning in the haptics mode, would aid the child to gain social capabilities to interact with other people. The system may be used for collaborative diagnosis and therapy. The system may behave similarly to commercial surgical training and assessments system (e.g. Intuitive Surgical da Vinci) or flight simulation systems. In one embodiment, there are multiple clinicians 1107 who can share the child video 1115 either through Internet or other means 1119 from remote locations or from the same location. The clinicians 1107 could collaboratively diagnose the status of the patient 1101, and collaboratively propose therapeutic interventions through the robot 1105 to render motion or force demonstration.

In one embodiment, to actively interact with children by active movement, the robot is capable of estimation of the child's head pose and gaze direction. Methods such as appearance template [Matsumoto 2000] and other can be used to detect six facial features (four corners or eyes and two corners of mouth) by normalized correlation. Alternate approaches may also be used for face or body detection. 3D stereo matching may then performed to determine, the Cartesian position of each feature. FIG. 7 depicts a Kalman filter-based face tracking example of a patient 1201 in a series of camera images. In this example, superimposed circles 1203 depict the position measurement directly from the current camera image of the given frame and the squares 1205 depict the estimated position based on the filtered output. The Kalman filter, or other related approach, provides a smooth estimate of the head position of the patient 1201, even in the presence of noise or sporadic missing camera data. The filter may also be used to assist in tracking and identifying the same person when multiple people are present in the video image. Similar techniques may be used for tracking the body or limbs of the patient 1201.

Figure 13:
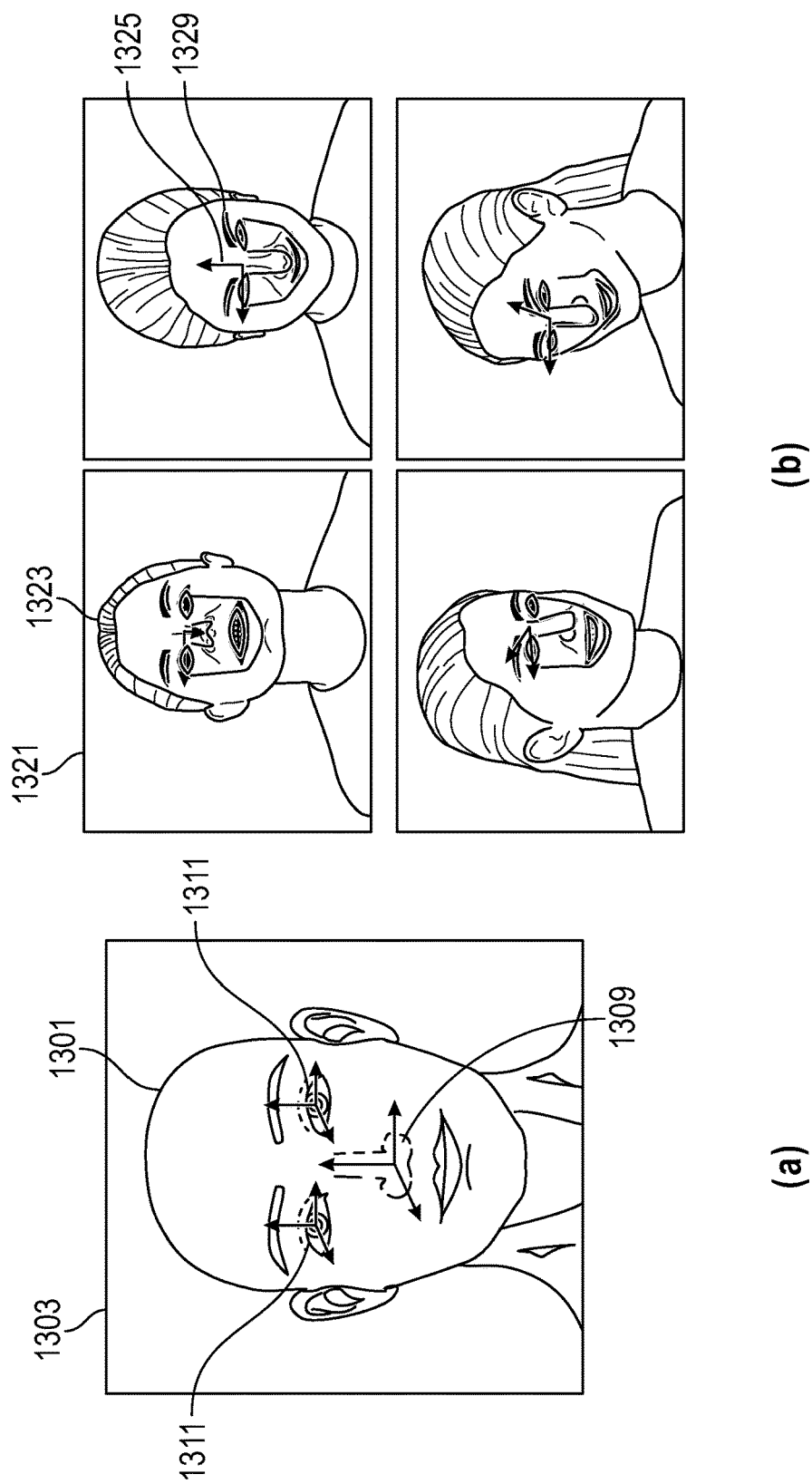
FIG. 13 depicts face tracking and gaze direction with images depicting the head gaze coordinates for different head orientations.

In one embodiment, software tracks the location and orientation of a child's head with respect to camera's in the eyes of a robot or another location. FIG. 13a depicts coordinate frames on a child or other patient's head 1301 in a video feed 1303, illustrates Gaze direction can be inferred from the coordinate frame 1309 attached to the child's head 1301, or by tracking the child's eye motion directly represented by coordinate frames 1311. Tracking may also be used to localize the child and monitor behaviors and body motion. Stereo cameras may provide 3D tracking information. FIG. 13b depicts a series of gaze tracking snapshots 1321 of the patent's head 1323 showing the head gaze coordinate frame 1325 and additional extracted facial features 1329 for four different representative head orientations. In one configuration, the algorithm is implemented with commercially available software such as FaceAPI (Seeing Machines Limited, Australia) to track the location and orientation 1325 of a child's head 1323 with respect to the cameras in the robot's eyes. Gaze direction can be inferred from the shown coordinate frame. In the present embodiment, it allows highly robust and real-time face tracking and provides head position and orientation coordinates per frame of video, Head motion in ±80° is allowed for successful detection. It is also robust to partial occlusions, illumination, skin color variation and glasses, etc. Further processing may be used to determine the direction of the eye gaze. This information may be used by for assessment of a patient's treatment progress, for diagnosis, or for making cogent interactions with a robot.

Figure 14:
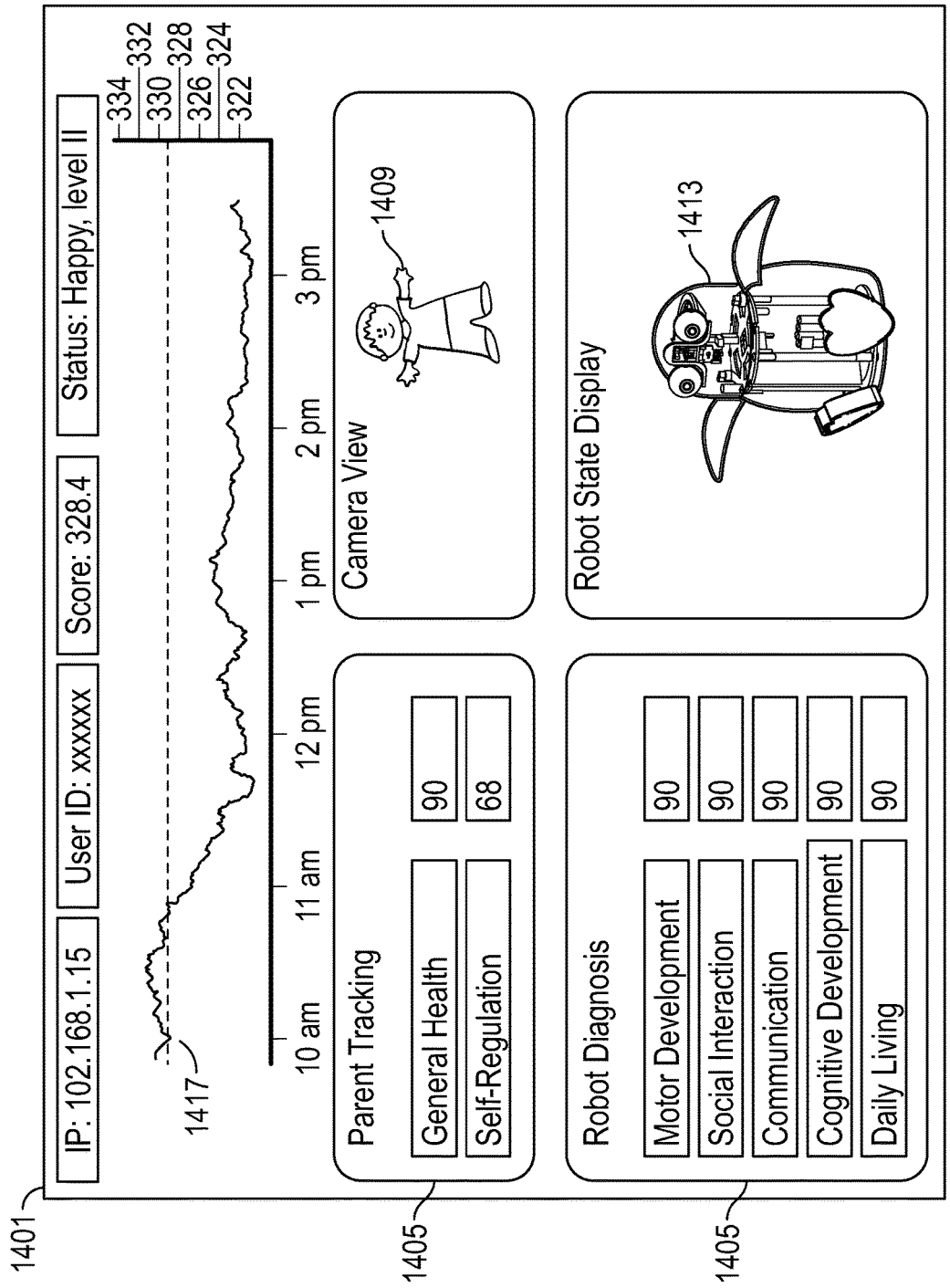
FIG. 14 depicts one embodiment of a clinician user interface that encompasses charting children's status, tracking child's progress, automatic analysis of behavioral attributes, remote observation of child behavior and robot motion.

FIG. 14 depicts one exemplary embodiment of a display 1401 that a clinician or other supervisory user could interact with. It may be used with a robot either in real-time or for post-processing of collected data. A series of data 1405 can be used to quantity a child or other patient's status and these include but are not limited to: general health, self-regulation, motor development, social interaction, communication, cognitive development, and daily living, Parents or other users may track and record progresses that may include: therapy assessment metrics, general health, and self-regulation to the robot's computer. In one configuration, the robot may automatically estimate and diagnose the child's behavior based on collected data and alter its behavior secondary to the collected data to enhance the therapy. A user can observe a child through the video feed 1409 which may include stereo cameras and the robot status 1413 would be automatically displayed in the user interface. Quantitative metrics may be charted within or among sessions as depicted in 1417.

The robot may be operated in the following primary modes: 1) in an autonomous mode, the robot interacts with the child with no real-time control by a clinician. The behavior may be adapted based on sensory data, a preprogrammed treatment plan, or interactive updates from a clinician or other user. 2) In a teleoperation mode, a therapist or other supervisory user (either at remote site or co-located with the child) could observe the child's behavior and control robot movement, 3) in as semi-autonomous mode, the clinician controls higher level functionality such as head movement or emotion, and other behaviors or specific motions are performed autonomously. In one exemplary configuration, a clinician remotely controls the robot head movement through a joystick, gamepad or other user interface while the eyes automatically track the child. Further, the clinician could command a given emotional response or behavior and the robot can perform a pre-programmed response which may be statically predefined or interactive.

In a further embodiment, the robot can be used as an instrument for diagnosis or charting treatment progress. The system may record a children's behavior and automatically evaluate the treatment progress with qualitative metrics. This capability may be implemented as a stand-alone mode, or it may be incorporated into any of the other mode of operation to monitor the child during therapy.

Figure 15:
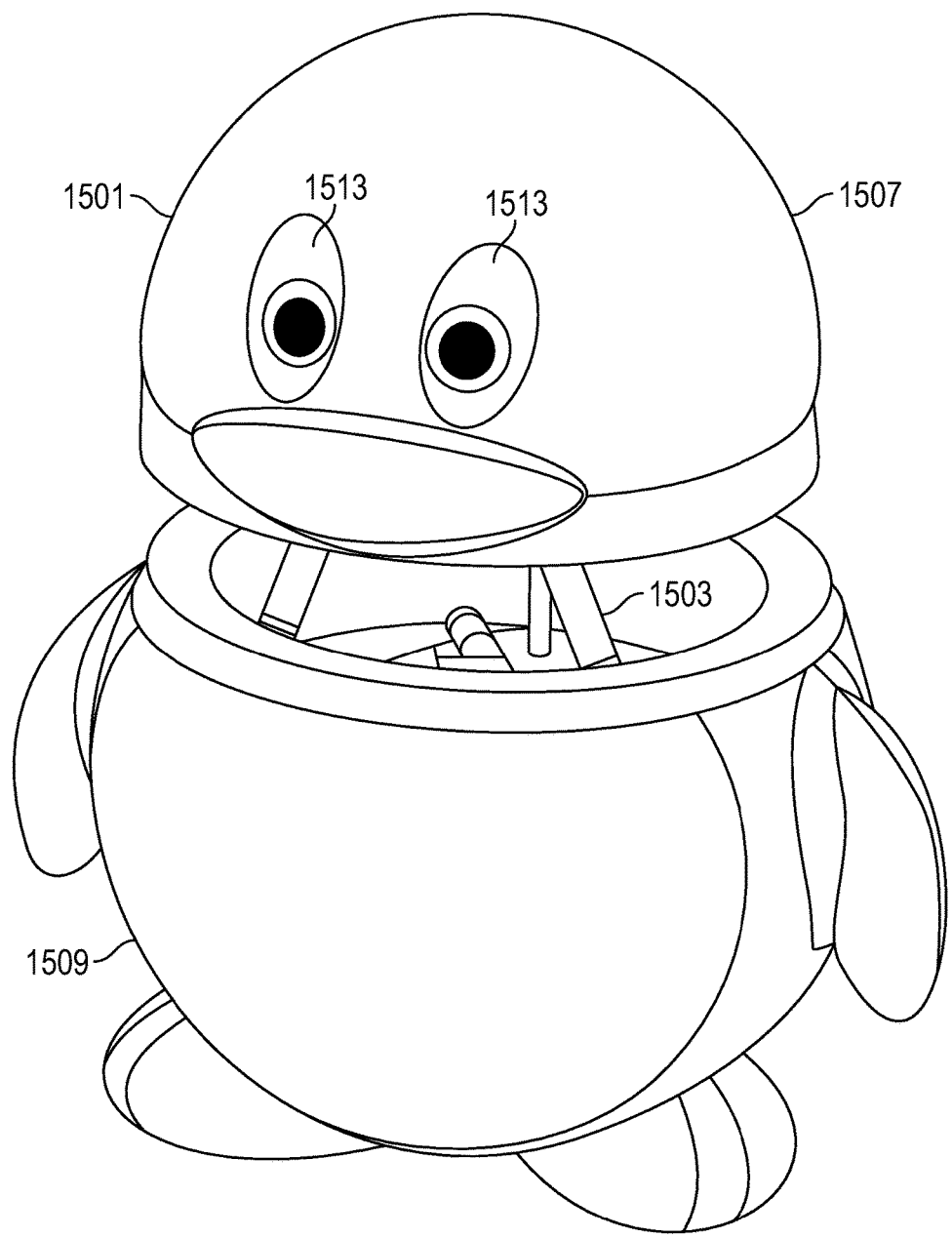
FIG. 15 depicts one embodiment of a robot where the robot takes on the form of a cartoon-like penguin with a neck utilizing a parallel mechanism.

One embodiment of robot 1501 is depicted in FIG. 15, wherein the robot's neck incorporates a parallel manipulator 1503, in this embodiment, the head 1507 is controlled with respect to the body 1509 with two cable-driven limbs embedded with preloaded springs and one passive limb. Based on human head anatomy and biomimetics, the neck has 3 degree of freedom motion: pan, tilt and one decoupled roll. Further, in this embodiment, each eye 1513 has independent pan and synchronous tilt motion (3 DOF eyes).

Figure 16:
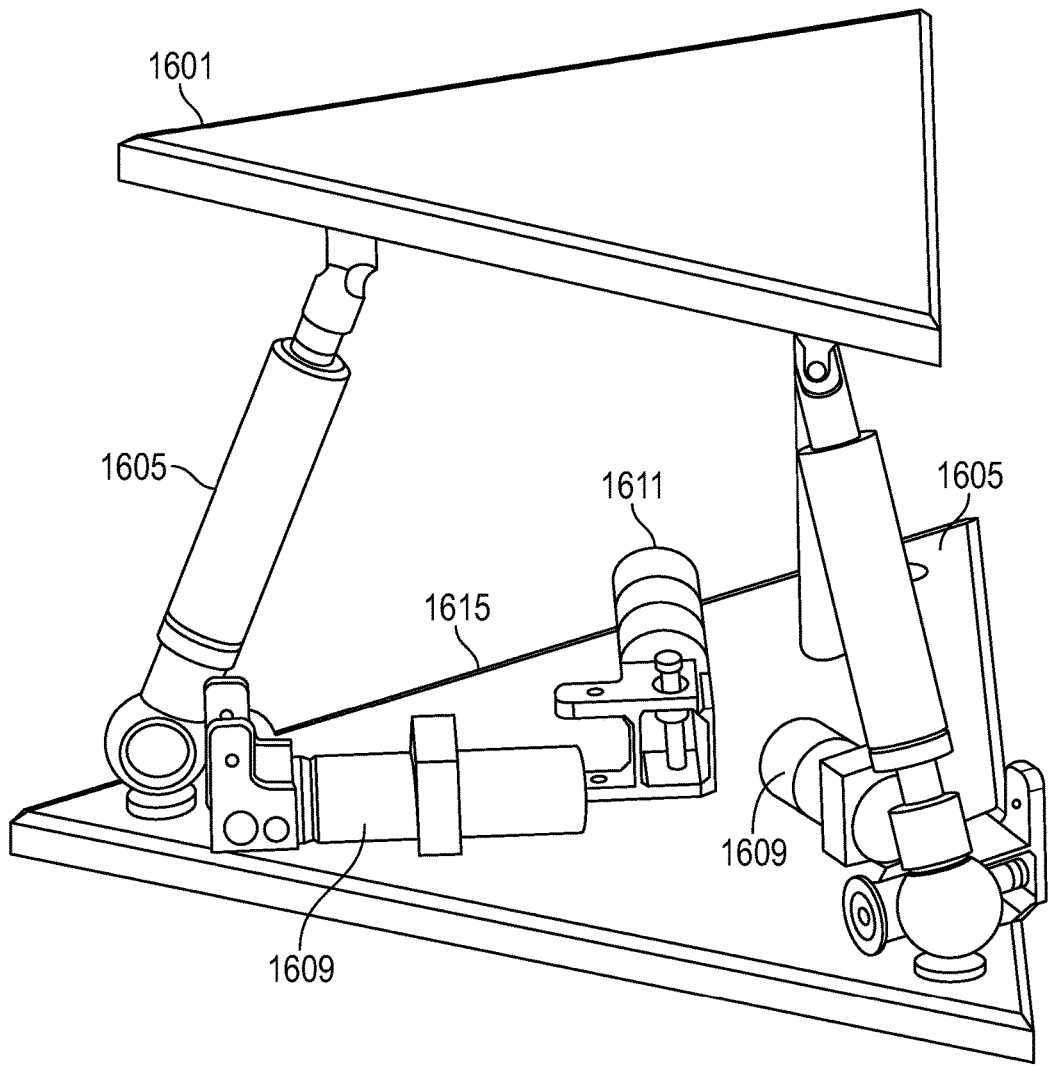
FIG. 16 depicts a cable-driven parallel manipulator for controlling a robot's head.

Shown in further detail in FIG. 16, to increase the robot robustness and guarantee safe human-robot interaction, the robot can have a parallel mechanism structure two cable-driven actuated UPS (U represents universal joint, P represents prismatic joint and S represents spherical joint) limbs 1605 embedded with preloaded springs and one passive limb. The cables are driven by motors 1609. And additional actuator 1611 provides the pan rotation. In one embodiment, the compliant mechanism 1605, whose stiffness could be adjustable, can be utilized to render soft tactile sensation during the physical contact with a child. This is especially important because children affected by autism and PDDs are often fond of soft, squishy, or fluffy materials. This further provides safety and robustness. All motors 1609 and 1611 are fixed on the base 1615 to minimize the inertia of the moving parts and mitigate limb interference.

Figure 17:
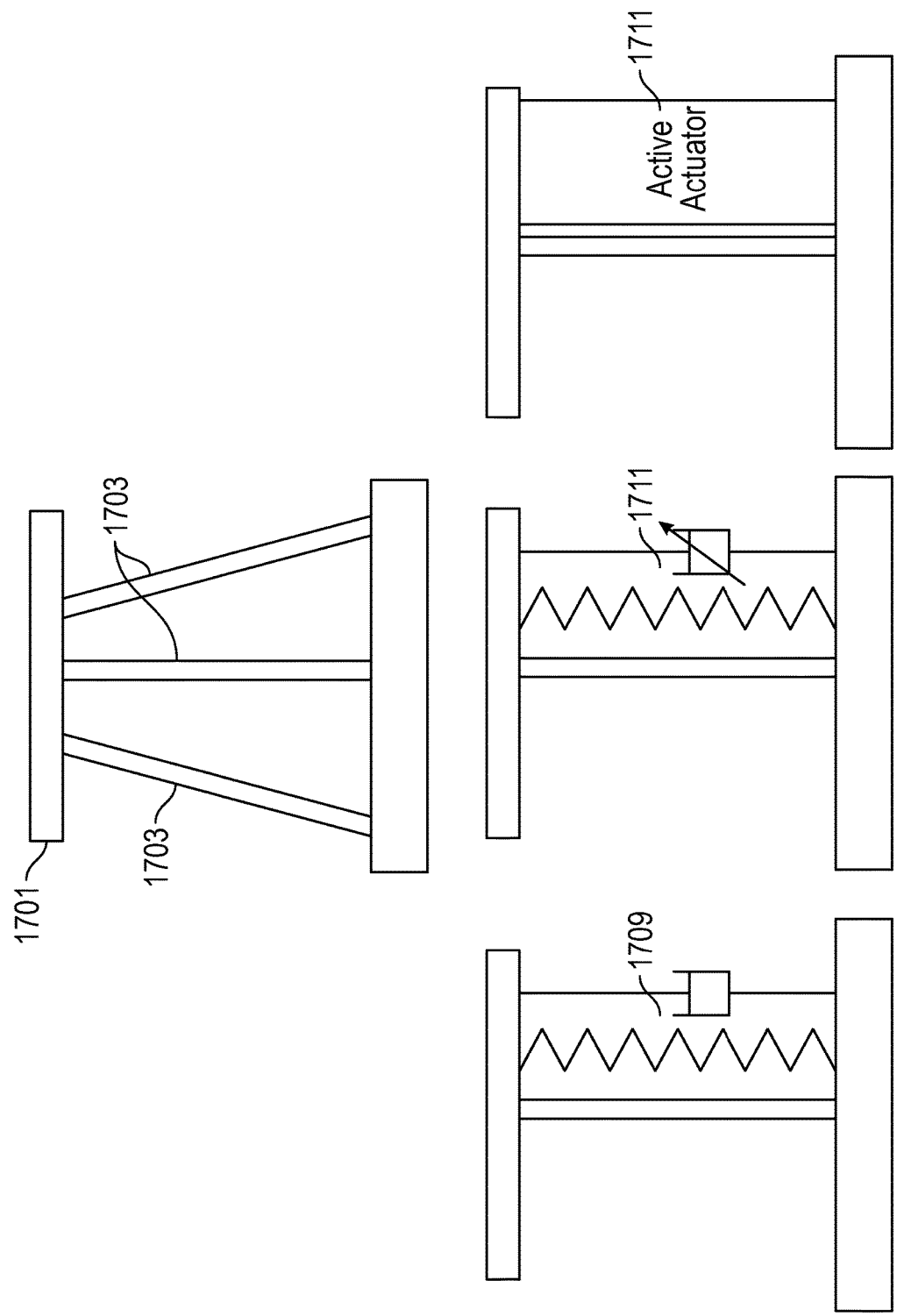
FIG. 17 depicts configurations of compliant mechanisms for actuating a parallel manipulator for controlling a robot's head.

FIG. 17 further depicts configurations for an adjustable stiffness parallel mechanism. The stiffness of one or more of the legs 1703 are adjustable. The legs 1703 may comprise passive 1709, semi-active 1711, active damping 1713 mechanism for each limb of the parallel mechanism 1701.

Figure 18:
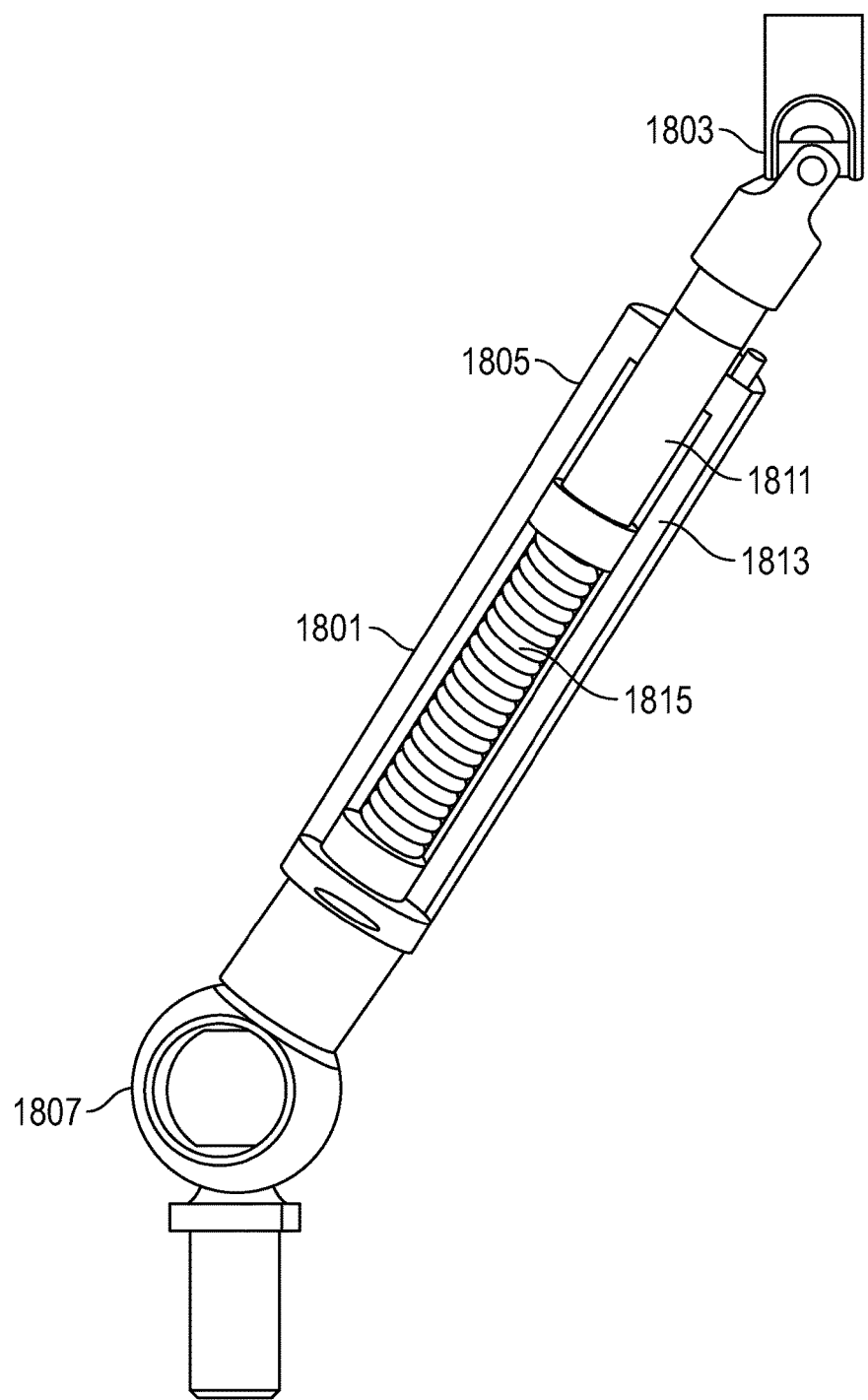
FIG. 18 depicts a cable-driven elastic limb that provides compliant motion.

FIG. 18 depicts an embodiment of a cable-driven elastic limb 1801. In one configuration, each active limb has a universal 1803, prismatic 1805, and spherical 1807 joint connection. One piston 1811 is inserted into a hollow cylinder 1813 and pushed against a preloaded spring 1815. The cable (not shown) running from the motorized pulley connects to the base of the inner piston 1811. When a motor winds the cable, the piston 1811 extends and when the motor releases the cable, the piston retracts. In one configuration, the spring 1815 provides the retraction force while a spring-loaded cable tensioner allows for compliance in the retraction direction and to take up excess slack if an external force extends the piston. Alternatively, the cable may be configured to actively drive piston 1811 in both directions.

Figure 19:
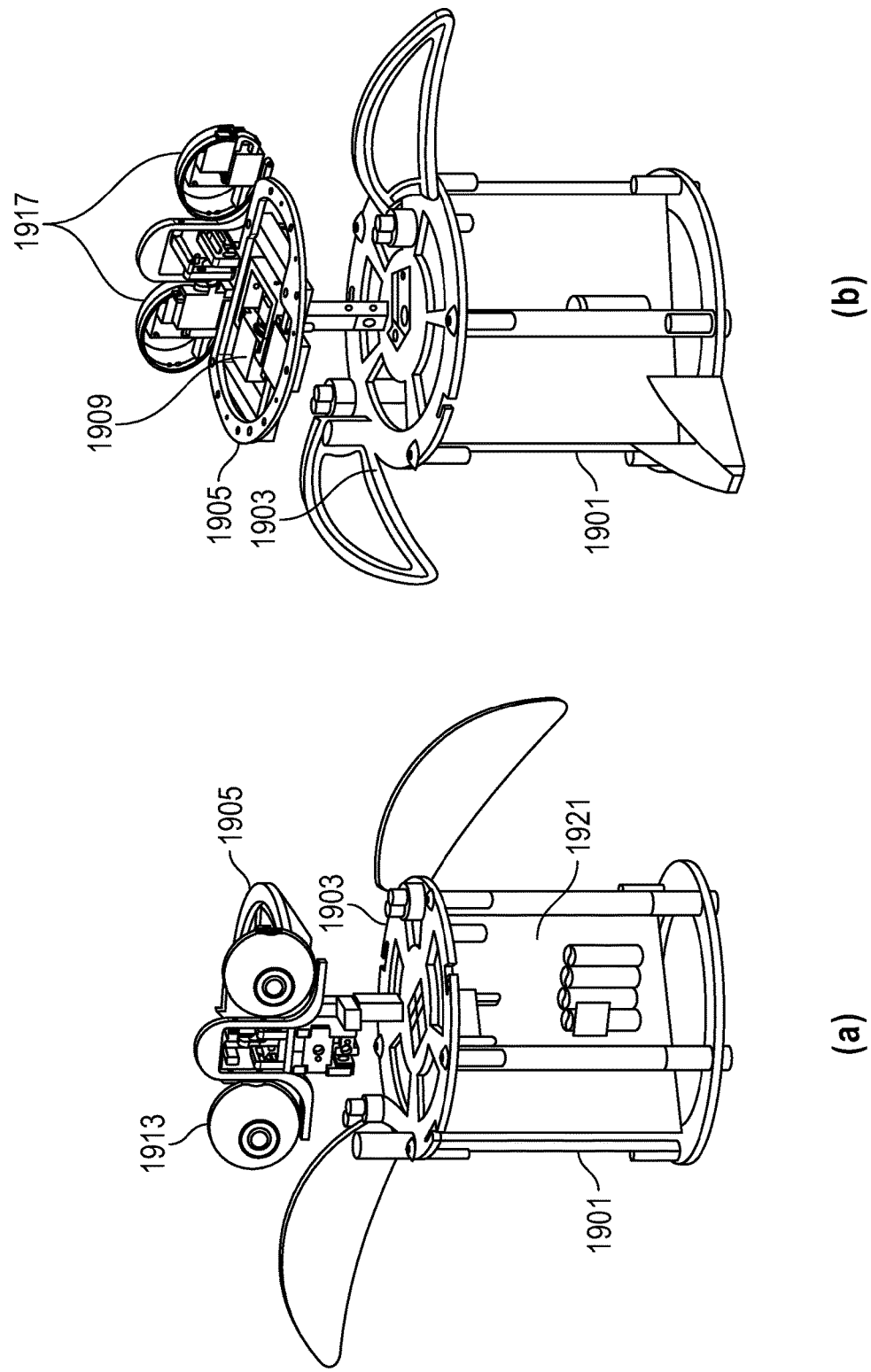
FIG. 19 depicts one embodiment of a robot, in this embodiment the neck is a gimbal mechanism. A gimbal provides the robot's head with tilt and roll mounted upon a neck rotation. The head is attached to the body utilizing magnets fix compliance.

In an alternate embodiment depicted from two viewpoints in FIG. 19, the robot's main structure is composed of three main tiers: a base 1901 where control and power electronics reside, a fixed upper level 1903 where wings are located, and a rotating top level 1905 which holds a pan-tilt gimbal unit 1909 for the head, in one embodiment, these tiers, as well as several servo motor mounts and other parts, were made from acrylic or other plastic materials to reduce material and manufacturing costs. One embodiment of the robot has 11 DOF: 3 DOF head/neck with 3 DOF for a pair of eyes and an additional 1 DOF for each eyelid, a 1 DOF beak, and 1 DOF for each of the wings. The head 1913 has cameras in each eye 1917 to assist in face and motion tracking as described earlier, and the robot also has a speaker and a microphone for recording and interacting with a child. The robot may incorporate one or more computers or other controllers 1921. In one configuration, the electronic components are suspended with elastic or other compliant material inside the base 1901 to provide shock absorption. In one embodiment, to ensure compliance and robustness, the head is attached to the body utilizing, magnets.

Figure 20:
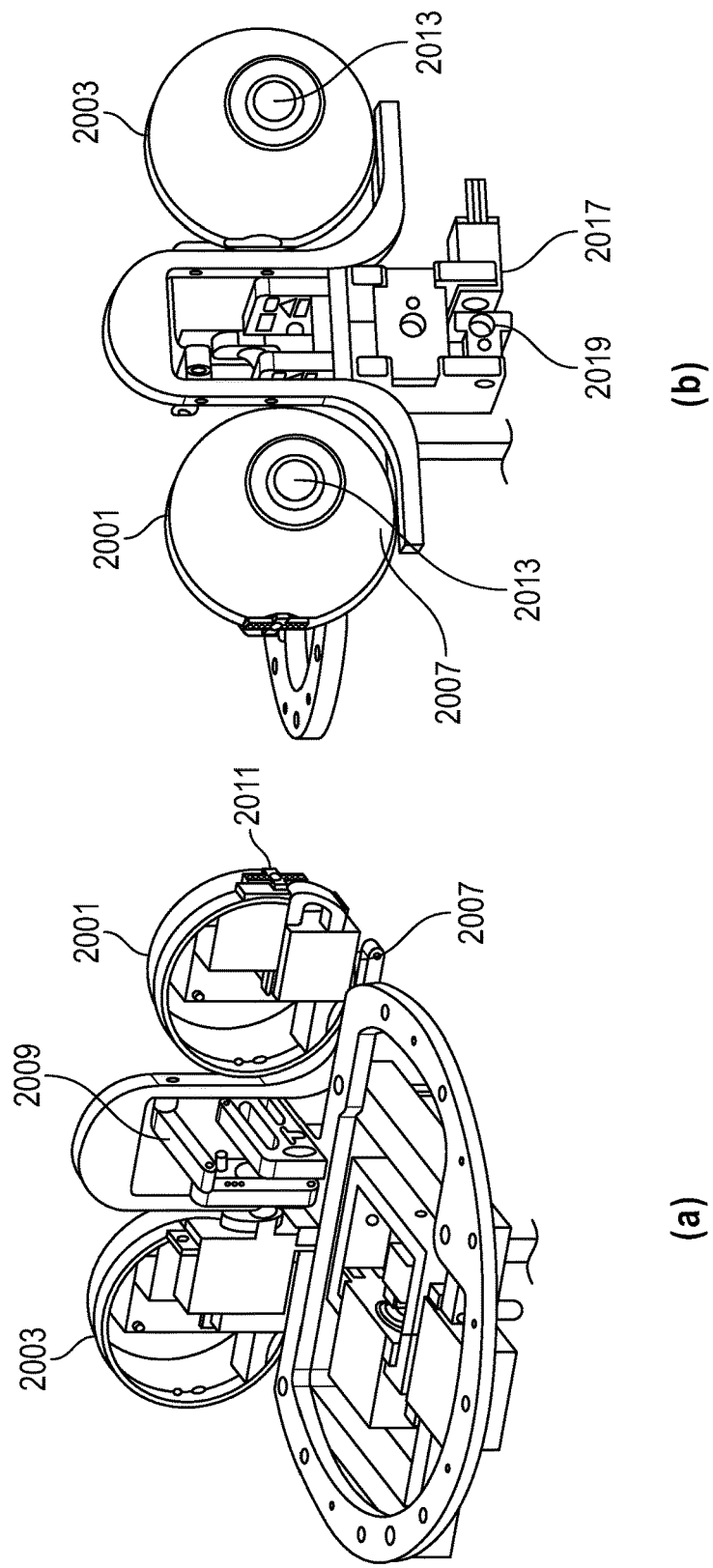
FIG. 20 depicts a structure of a robot's eyes. In this embodiment, the eyes have independent pan, coupled roll, and independent eyelids. In one embodiment, each eye incorporates a camera in the pupil to provide stereo vision capabilities.

FIG. 20 depicts a structure of the robot's eyes 2001 and 2003 from two viewpoints. In this embodiment, the eyes have independent pan 2007, coupled roll 2009, and independent eyelids 2011. In one embodiment, each eye incorporates a camera 2013 in the pupil to provide stereo vision capabilities. The eyes each have an independent rotation of ±90° about the vertical axis so that they can pan left and right, and they have a coupled rotation of ±45° about the horizontal axis so that they tilt up and down together providing 3 DOF with speeds controllable up to approximately 300 deg/sec. A further 2 DOF includes independent control of eyelids. The servo that tilts the eyes is attached to the eyes with a four-bar linkage. The remaining servos that drive the eyes and eyelids are located within the eyes themselves. Making the eyes large enough to accommodate the servo motors enhances the intended cartoon-like appearance of the robot, as large eyes are a typical feature of non-threatening cartoon-like creatures. Additional shown is the beak, or mouth actuator 2017. The beak is coupled to the head through a magnetic or other detachable coupling 2019 for robustness and safety.

Figure 21:
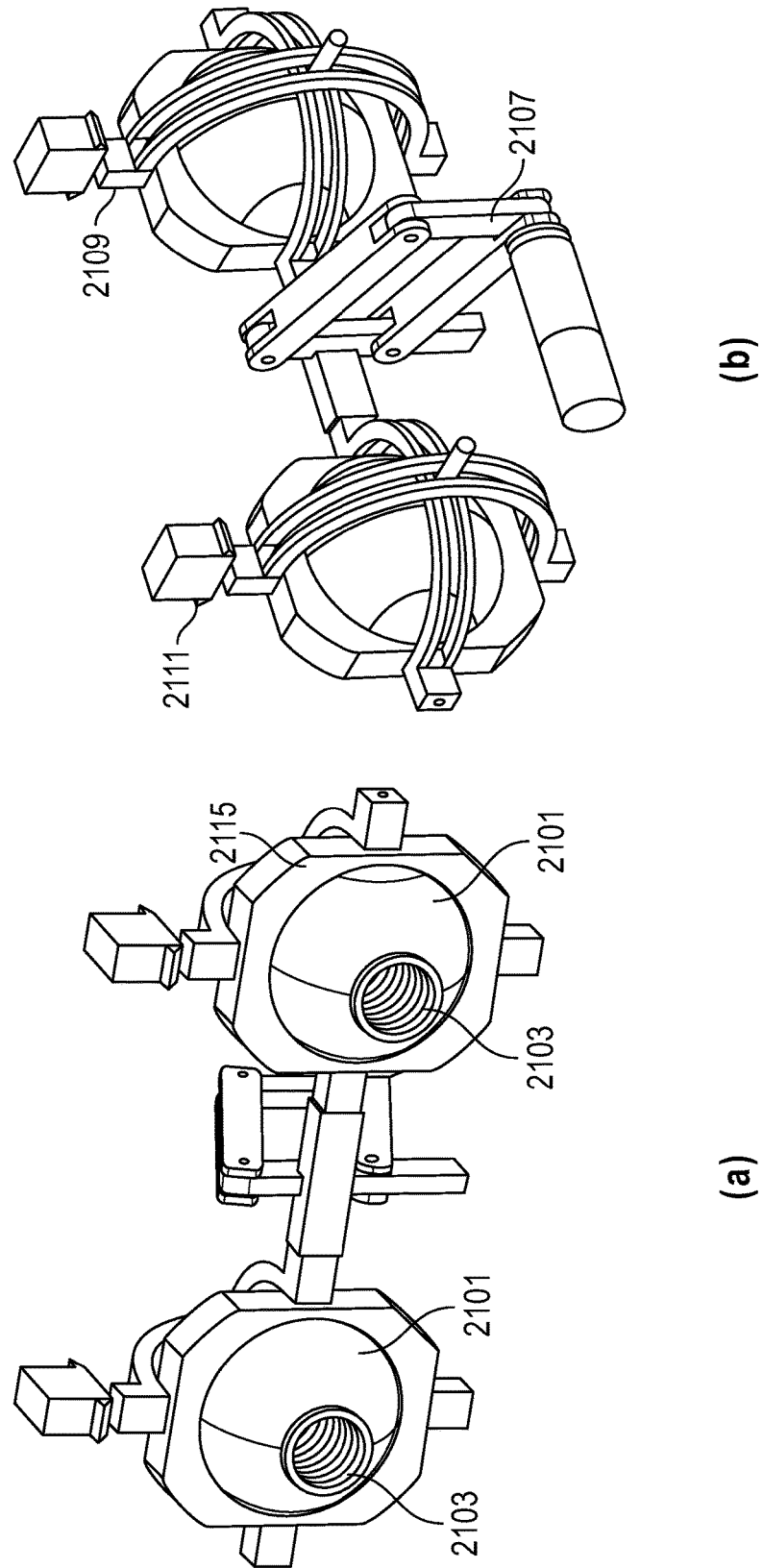
FIG. 21 depicts a ball-in-socket eye mechanism for a robot. Eyes may contain cameras or other sensors such as range finders. This embodiment incorporates independent eye pan and coupled eye tilt.

FIG. 21 depicts an alternate embodiment with a ball-in-socket eye mechanism from two viewpoints. Eyes 2101 may contain cameras 2103 or other sensors such as range finders or others as described previously. This embodiment incorporates independent eye pan 2107 and coupled eye tilt 2109 and 2111. In one embodiment, the eye mechanism is adapted for low-cost webcam with a succinct ball-in-socket structure 2115, in one embodiment, the eye mechanism is designed to provide a simple and compact motion driver to accurately control the eye ball orientations in a decoupled manner where both eyes have two independent DOF. In one configuration, each eye contains a spherical webcam 2103 which provides stereo vision and the ability to both tracks faces and provides facial cues. This embodiment is bio-inspired with a 'ball-in-socket' structure to provide realistic eye motions. Each eye has 90° pans and 90° tilt motion capability. In one embodiment, the design couples the tilt 2107 of both eyes to constrain 1 DOF motion which would guarantee synchronous tilt motion. The camera itself has a horizontal 50° and vertical 37.5° degrees view angle. The mechanism combined with the cameras provide for human-like speed and range of motion providing a 90° motion in under 0.18 s.

Figure 22:
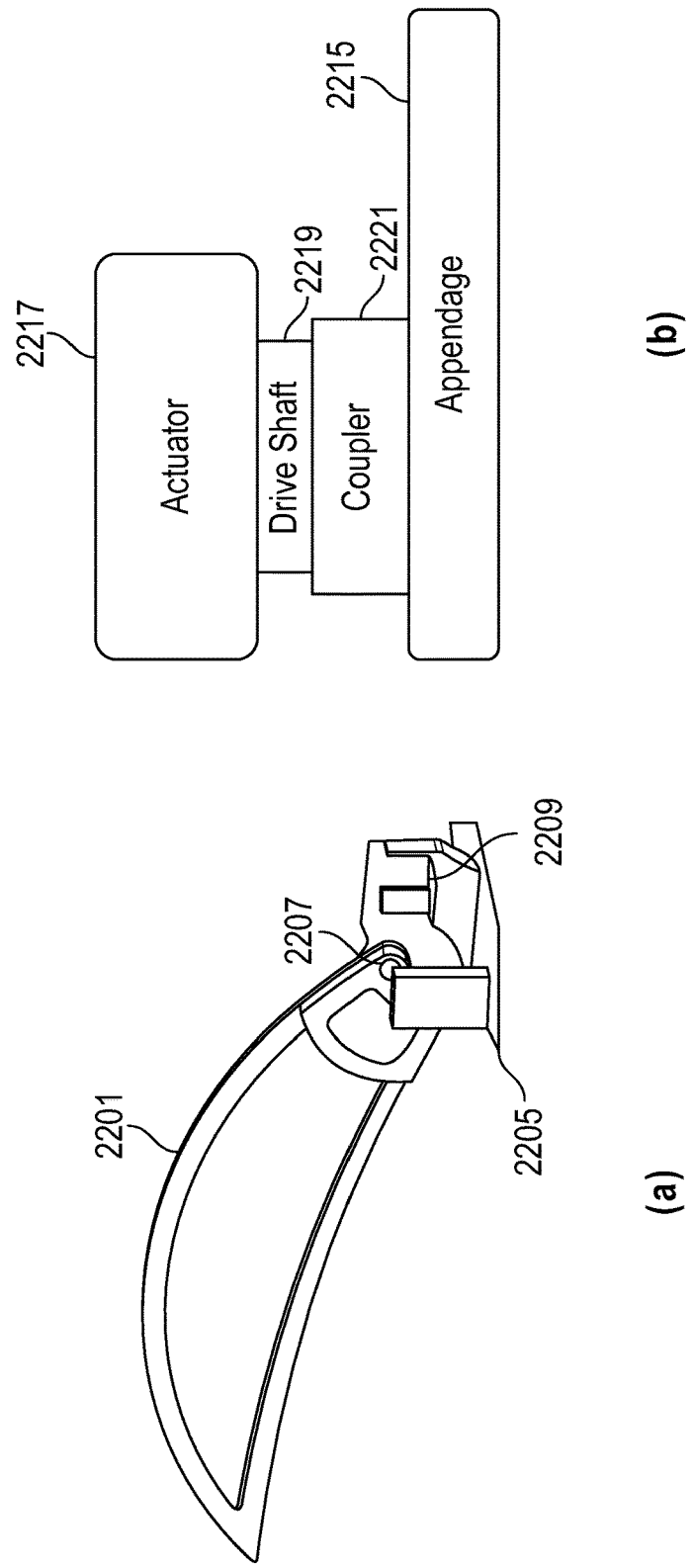
FIG. 22 illustrates independently controllable, compliant appendages which may be detachably coupled to the body of a robot by magnet or other means.

Independently controllable, compliant appendages may be attached to the body of the robot as depicted in FIG. 22*a*. The robot's appendages both give the robot a more friendly cartoon-like appearance and also enhance the ability to present emotions and evoke responses from the children, in the form of a penguin, the appendages may comprise wings 2201 and may be one or more DOF each. Both of the penguin's wings can be independently controlled. The wings 2201, being one of the most probable appendages to be pulled or twisted, are designed to be compliant to withstand pulling and twisting in any direction. In another embodiment, to enhance system robustness and reliability, the wings or other appendages 2201 are attached to the body 2205 by magnets or other compliant or detachable coupler 2207. The wings may be driven by actuators such as a servo motor 2209, but if they were pulled on, they would separate or slip from the joint with no damage to the robot. The wing may be made from thin polycarbonate, giving it compliance. FIG. 22*b* depicts a more general compliant actuation system for robot appendages. Appendage 2215 is driven by actuator 2217. The actuator 2217 may be a servo motor, a standard dc motor, or other actuator. The drive shaft or servo horn 2219 of motor 2217 is coupled to appendage or other robot element 2215 through a couple 2221. Coupler 2221 may have one or more magnets to allow the appendage to be safely decouple and reattached. Alternatively, a clutch or slipping mechanism may be utilized as coupler 2221. In a further embodiment, coupler 2221 serves as a series elastic element between actuator 2217 and appendage 2215.

In one embodiment the robot's motions are actuated using servo motors, other forms of actuation including cable driven actuators may also be utilized for all motions in the robot.

The above description provides details about embodiments of a robot that takes the form of a compact, low-cost, cartoon-like penguin; however, the present invention is not restricted to only the configurations or patient population shown.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Each one of the processing component of the robot and the supervisory processing component includes one or more processors and computer usable media having computer readable code embodied there in that instructs the one or more processors; the one or more processors and the computer usable media being operatively connected by a connection component. "Configured to," as used herein the reference to the processing component or the supervisory processing component, refers to the computer usable media having computer readable code embodied therein that instructs the one or more processors in the processing component or the supervisory processing component to perform the action that the components are configured to perform.

Elements and components described herein may be further divided into additional components or joined together to form fewer components for performing the same functions.

Each computer program may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-usable medium to perform functions of the invention by operating on input and generating output.

Common forms of computer-usable media include, for example, a floppy disk, a flexible disk, hard disk, magnetic tape, or any other magnetic medium, a CDROM, any other optical medium, any physical medium with patterns of holes, a RAM, a PROM, and EPROM, a FLASH-EPROM, any other memory chip or cartridge, all of which are non-transitory. As stated in the USPTO 2005 Interim Guidelines for Examination of Patent Applications for Patent Subject Matter Eligibility, 1300 Off. Gaz. Pat. Office 142 (Nov. 22, 2005), "On the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal."

The present teachings can be practiced by employing conventional materials, methodology and equipment. Accordingly, the details of such materials, equipment and methodology are not set forth herein in detail. In the previous descriptions, numerous specific details are set forth, such as specific materials, structures, processes, etc., in order to provide it thorough understanding of the present invention. However, it should be recognized that the present teachings can be practiced without resorting to the details specifically set forth, Only an exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein and the appended claims

What is claimed is:

1. A robot configured to provide or assist in providing applied behavior analysis therapy and generate applied behavior analysis therapy data, the robot comprising:
  a plurality of actuators;
  a plurality of sensors including at least one camera;
  interaction inducing components operatively connected to the plurality of actuators;
  a control component operatively connected to the plurality of actuators;
  a processing component operatively connected to the control component and to the plurality of sensors, the processing component comprising:
    a processor; and
    a non-transitory computer usable media having computer readable code embodied therein which, when executed by the processor, cause the processor to perform operations for operating the interaction inducing components to perform one of providing and assisting in providing applied behavior analysis therapy between the robot and a human subject, the operations comprising:
      generating, as part of the applied behavior analysis therapy, an instructive command for the interaction inducing components, the instructive command selected from a plurality of predetermined commands designed to cause a behavioral response by the human subject;
      transmitting the instructive command to at least a portion of the interaction inducing components and the plurality of actuators, to produce at least one of a motion, a gesture, and a sound;
      receiving, via the plurality of sensors, and in response to the instructive command, a behavioral response of the human subject, the receiving comprising tracking gaze direction of the human subject via the camera, the tracking of the gaze direction comprising capturing images of a face of the human subject in a video feed and tracking eye motion of the human subject by generating coordinate frames that represent eyes of the human subject, wherein the behavioral response comprises a result generated from the tracking of the gaze direction;
      generating, based on the behavioral response, including the result, a quantitative measure of the human subject,
      wherein the quantitative measure is associated with at least one of cognitive development, behavioral development, emotional development, and social development; and
      utilizing the quantitative measure to perform at least one of charting progress of the applied behavior analysis therapy and diagnosis of the human subject.

2. The robot of claim 1, wherein the computer readable code, when executed by the processor, causes the processor to perform additional operations comprising:
  receiving, from an external system, supervisor instructions, wherein the supervisor instructions are used in the generating of the instructive command.

3. The robot of claim 1, wherein the computer readable code, when executed by the processor, causes the processor to perform additional operations comprising:
  communicating with a display; and,
  wherein the behavioral response further comprises an interaction between the human subject and objects displayed on the display.

4. The robot of claim 3, further comprising:
  a supervisory external system; and
  wherein the computer readable code, when executed by the processor, causes the processor to perform additional operations comprising:
    receiving, from the supervisory external system, at the processor, additional instructions for operating the interaction inducing components, wherein the additional instructions are based on a tailored therapeutic applied behavior analysis therapy program.

5. The robot of claim 3, wherein a game is displayed on the display; and
  wherein a game character displayed in the game represents at least one of the human subject or the robot.

6. The robot of claim 1, further comprising:
  at least one appendage operatively connected to at least one of the plurality of actuators, the at least one appendage configured to provide appendage motion.

7. The robot of claim 1, further comprising a component configured to provide positive reinforcement to the human subject based on the behavioral response.

8. The robot of claim 1, wherein one or more of the plurality of actuators are coupled to an interaction component, wherein the interaction component is configured with adjustable stiffness to render tactile sensation during physical contact with the human subject.

9. The robot of claim 1, wherein said robot further comprises:
a base;
a rotatable structure disposed above the base;
a head structure operatively connected to the rotatable structure and configured to perform a tilt motion and a roll motion, the head structure comprising two eye-shaped components, wherein each eye-shaped component is configured to move with at least one degree of freedom and one of the eye-shaped components comprising the at least one camera;
at least one actuator in the plurality of actuators being operatively connected to the rotatable structure and the head structure.

10. The robot of claim 6, wherein at least one sensor in the plurality of sensors is disposed on the appendages and is operatively connected to the processing component.

11. The robot of claim 1, wherein the at least one camera is located in eye-shaped component of the robot.

12. The robot of claim 1, wherein the processing component also comprises a data storage component; and
wherein the quantitative measure is used to provide a quantitative assessment of the human subject with respect to a disorder.

13. The robot of claim 3, wherein the display is a touch sensitive screen.

14. The robot of claim 1, wherein the behavioral response further comprises one or more of a change in facial expression, head pose, body posturing, and gestures.

15. The robot of claim 9, wherein the applied behavior analysis therapy guides social skills intervention for the human subject.

16. The robot of claim 1, wherein the tracking occurs over multiple frames of the video feed.

17. The robot of claim 1, wherein the computer readable code, when executed by the processor, causes the processor to perform additional operations comprising:
identifying treatment progress of the human subject based on the quantitative measure.

18. The robot of claim 1, wherein the quantitative measure is based on a psychological assessment criteria for diagnosing pervasive development disorders.

19. The robot of claim 1, further comprising:
changing robot behavior of the robot based on treatment progress of the human subject in the applied behavior analysis therapy.

20. The robot of claim 19, wherein the changing of the robot behavior comprises modifying the instructive command based on the behavioral response of the human subject.

21. The robot of claim 1, further comprising utilizing treatment progress of the human subject to update and modify the robot as the human subject's level of interaction improves.

22. A method comprising:
identifying, using a plurality of sensors on a robot, a human subject interacting with the robot, the plurality of sensors comprising at least one camera;
generating, via a processor on the robot, and as part of applied behavior analysis therapy between the robot and the human subject, an instructive command selected from a plurality of predetermined commands designed to cause a behavioral response in the human subject;
transmitting the instructive command to at least one actuator in a plurality of actuators in the robot, such that the at least one actuator produces at least one of a motion, a gesture, and a sound;
receiving, via the plurality of sensors in the robot, and in response to the instructive command, a behavioral response of the human subject, the receiving comprising tracking gaze direction of the human subject via the at least one camera, the tracking of the gaze direction involving capturing images of the human subject's face in a video feed, and thereby tracking the subject's eye motion by generating coordinate frames that represent the subject's eyes, wherein the behavioral response comprises a result generated from the tracking of the gaze direction;
generating, based on the behavioral response, including the result, a quantitative measurement related to at least one of cognitive development, behavioral development, emotional development, and social development of the human subject;
performing at least one of diagnosing a developmental disorder based on the quantitative measurement using a psychological assessment criteria and charting progress of the applied behavior analysis therapy using the quantitative measurement.

23. The method of claim 22, further comprising communicating with an external system, the external system being external to the robot.

24. The method of claim 23, wherein the external system is a display, and wherein the behavioral response of the human subject further comprises an interaction between the human subject and objects displayed on the display.

25. The method of claim 24, further comprising receiving, from an additional supervisory external system, supervisor instructions for engaging with the human subject via the external system, wherein the supervisor instructions are provided by a supervisor.

26. The method of claim 24, wherein a game is displayed on the display, wherein a game character in the game represents one of the human subject and the robot.

27. The method of claim 26, wherein the human subject operates the game through interactions with the robot.

28. The method of claim 26, wherein the human subject interacts with the game via a game controller.

29. The method of claim 23, wherein the communicating with the external system further comprises transmitting the behavioral interaction to the external system from the robot.

30. The method of claim 22, further comprising:
recording the behavioral response in a non-transitory computer-readable storage medium.

31. The method of claim 23, further comprising receiving, from an additional supervisory external system, therapy guidance used in generating the instructive command.

32. The method of claim 22, wherein the behavioral response further includes interactions between the robot, another robot, and the human subject.

33. The method of claim 22, wherein the behavioral response includes interactions between the human subject, one or more human beings, and the robot.

34. The method of claim 22, wherein the plurality of actuators are connected to a plurality of interaction inducing components.

35. The method of claim 22, wherein the applied behavior analysis therapy targets at least one disorder from the group consisting of general health, self-regulation, motor development, social interaction, communication, cognitive development, and daily living.

36. The method of claim 22, further comprising making an assessment based on quantitative measurement; and
altering future instructive commands based on the assessment.

37. The method of claim 24, wherein the interaction between the human subject and the objects displayed on the display relates to the human subject selecting an object from a set of displayed objects.

38. The method of claim 23, wherein
wherein the external system is configured for reviewing recorded data and performing real-time processing the recorded data.

39. The method of claim 38, wherein the external system generates the quantitative measures, and the quantitative measure is related to at least one of cognitive development, behavioral development, emotional development, and social development of the human subject.

40. The method of claim 30, wherein the behavioral response is stored as one of audio, video, 3D imaging, and robot configuration, and the behavioral response is identified based on one of times or frame identifiers.

41. The method of claim 22, further comprising:
identifying treatment progress of the human subject based on the quantitative measurement.

42. A method comprising:
receiving, at an external system, sensor data, the sensor data from an interaction between a human subject and a robot, the interaction comprising:
the robot generating, via interaction inducing components, an action as part of an applied behavior analysis therapy, the action is generated via at least one actuator of a plurality of actuators of the robot, said action comprising one of a motion, a gesture, and a sound; and
the robot recording, via a plurality of sensors, including at least one camera, behavior of the human subject in response to the action, the recording including tracking of gaze direction of the human subject via the at least one camera, the tracking of the gaze direction comprising capturing images of a face of the human subject in a video feed and tracking eye motion of the human subject by generating coordinate frames representing eyes of the human subject to yield the sensor data and a result generated from the tracking of the gaze direction;
generating, based on the sensor data and the result, a quantitative measurement associated with at least one of cognitive development, behavioral development, emotional development, and social development of the human subject;
performing one of a diagnosis of the human subject based on a comparison of the quantitative measurement to psychological assessment criteria and charting progress of the applied behavior analysis therapy using the quantitative measurement.

43. The method of claim 42, further comprising identifying treatment progress of the human subject based on the quantitative measurement.

44. The method of claim 43, wherein previous data from previous interactions between the human subject and the robot is stored at the external system; and
wherein the sensor data from the interaction between the human subject and the robot and the previous data from previous interactions are used to chart progress of the human subject.

45. The method of claim 44, wherein the sensor data is further used to modify behavior of the robot and modify a course of therapy of the human subject.

46. The method of claim 42, wherein the sensor data is used to perform at least one aspect of a diagnosis of a plurality of disorders.

47. The method of claim 42, wherein the robot is preconfigured with a plurality of actions to be used as part of the applied behavior analysis therapy, the plurality of actions designed to evaluate disorders within the human subject.

48. The method of claim 42, wherein the quantitative measurement is used in evaluating treatment progress of the human subject in one or more areas comprising speech, language, communication, sociability, cognitive awareness, health, physical and behavior.

49. The method of claim 48, wherein the evaluating is based on a standard psychological metric from the psychological assessment criteria.

50. The method of claim 48, wherein continuous assessment of treatment progress is used to modify the robot's behavior as the human subject's level of interaction changes.

51. The method of claim 42, wherein the psychological assessment criteria includes physiologic parameters.

52. A system comprising:
a plurality of actuators;
a plurality of sensors, including at least one camera;
interaction inducing components operatively connected to at least one actuator in the plurality of actuators;
a processor operatively connected to the plurality of actuators and to the plurality of sensors; and
a non-transitory computer usable media having computer readable code embodied therein which, when executed by the processor, causes the processor to perform operations comprising:
operating the interaction inducing components according to predetermined instructions as part of applied behavior analysis therapy for a human subject, such that the interaction inducing components generate one of a robotic motion and a sound;
recording, via the plurality of sensors, a behavioral reaction of the human subject in response to the operation of the interaction inducing components, the recording comprising tracking gaze direction of the human subject via the at least one camera, the tracking of the gaze direction comprising capturing images of a face of the human subject in a video feed and tracking eye motion of the human subject by generating coordinating frames that represent eyes of the human subject, the behavioral reaction comprising a result generated from the tracking of the gaze direction;
generating behavior analysis therapy data based upon the behavioral reaction, including the result, the behavior analysis therapy data comprising a measurement of at least one of cognitive development, behavioral development, emotional development, and social development of the human subject; and
using the behavior analysis therapy data for at least one of a diagnosis of a disorder of the human subject and a charting of the applied behavior analysis therapy.

53. The system of claim 52, further comprising a haptic device.

54. The system of claim 53, wherein the haptic device is remotely controlled by a supervisor.

55. The system of claim 52, wherein the predetermined instructions are augmented by supervisor instructions received from an external device.

56. The system of claim 55, wherein the supervisor instructions are provided from a puppet-like device.

57. The system of claim 52, wherein the computer readable code further instructs the processor to record movement patterns of the human subject after the operation of the interaction inducing components via the at least one camera.

58. The system of claim 52, wherein the behavior analysis therapy data is communicated to an external device after completion of a therapy session.

59. The system of claim 52, further comprising a display, wherein the display shows at least one of a video, a stereo camera view, a robot status, a human subject's progress according to caregiver feedback, an automatic analysis and diagnosis of the human subject's response, a behavior associated with the applied behavior analysis therapy, and a movement associated with the behavioral reaction.

60. The system of claim 59, wherein specific behaviors are identified automatically; and wherein recorded video segment associated with the specific behaviors is shown on the display.

* * * * *